US012749827B2

(12) United States Patent
Woo et al.

(10) Patent No.: US 12,749,827 B2
(45) Date of Patent: Sep. 29, 2026

(54) ARRAY ANTENNA AND ELECTRONIC DEVICE COMPRISING SAME

(71) Applicant: LG ELECTRONICS INC., Seoul (KR)

(72) Inventors: Seungmin Woo, Seoul (KR); Yusuhk Suh, Seoul (KR); Dongik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 18/875,623

(22) PCT Filed: Jun. 23, 2022

(86) PCT No.: PCT/KR2022/008975
§ 371 (c)(1),
(2) Date: Dec. 16, 2024

(87) PCT Pub. No.: WO2023/249144
PCT Pub. Date: Dec. 28, 2023

(65) Prior Publication Data
US 2025/0372888 A1 Dec. 4, 2025

(51) Int. Cl.
*H01Q 21/06* (2006.01)
*H01Q 1/38* (2006.01)

(52) U.S. Cl.
CPC ............. *H01Q 21/065* (2013.01); *H01Q 1/38* (2013.01)

(58) Field of Classification Search
CPC .......... H01Q 1/2291; H01Q 1/38; H01Q 1/40; H01Q 19/021; H01Q 21/065; H01Q 21/08;
(Continued)

(56) References Cited

U.S. PATENT DOCUMENTS 3,454,945 A * 7/1969 Hyltin ................ H01Q 21/0025 327/119
11,916,311 B2 * 2/2024 Compton ............. H05K 5/0017
(Continued)

FOREIGN PATENT DOCUMENTS

KR 10-2019-0030311 3/2019
KR 10-2019-0061467 6/2019
KR 10-2021-0141116 11/2021

OTHER PUBLICATIONS

European Patent Office Application Serial No. 22948078.5, Search Report dated Jun. 16, 2025, 5 pages.
(Continued)

*Primary Examiner* — Thien M Le
(74) *Attorney, Agent, or Firm* — LEE, HONG, DEGERMAN, KANG & WAIMEY

(57) ABSTRACT

An antenna module of an electronic device is implemented as a phased array antenna implemented on a dielectric cover substrate. The dielectric substrate may comprise: a first layer having a first conductive layer including a first opening and a second opening on a surface of the dielectric substrate; a second layer having a second conductive layer including a fourth opening and a fifth opening in the dielectric substrate; and a third layer having a third conductive layer including a third opening in the dielectric substrate. The antenna module may comprise: a dielectric cover layer; and a dielectric substrate having a surface mounted facing the dielectric cover layer.

8 Claims, 27 Drawing Sheets

(58) Field of Classification Search
CPC ...... H01Q 21/24; H01Q 21/28; H01Q 9/0414; H01Q 1/523; H01Q 25/001; H01Q 3/34; H01Q 5/50; H01Q 9/04
See application file for complete search history.

(56) References Cited

U.S. PATENT DOCUMENTS

| | | | | |
|---|---|---|---|---|
| 2019/0027802 | A1* | 1/2019 | Noori | H01Q 19/005 |
| 2020/0106192 | A1* | 4/2020 | Avser | H01Q 1/405 |
| 2021/0036432 | A1 | 2/2021 | Kim et al. | |
| 2021/0066814 | A1 | 3/2021 | Kim et al. | |
| 2021/0242601 | A1 | 8/2021 | Johansson et al. | |
| 2021/0328364 | A1 | 10/2021 | Jia | |
| 2021/0359404 | A1 | 11/2021 | Johansson et al. | |
| 2022/0085502 | A1 | 3/2022 | Arai | |
| 2022/0094061 | A1* | 3/2022 | Yong | H01Q 5/385 |
| 2022/0109464 | A1* | 4/2022 | Avser | H04B 1/40 |
| 2022/0393365 | A1* | 12/2022 | Wu | H01Q 5/385 |
| 2023/0084310 | A1* | 3/2023 | Cooper | H01Q 1/38 343/702 |
| 2023/0207999 | A1* | 6/2023 | Haratani | H01P 3/08 343/878 |
| 2024/0079779 | A1* | 3/2024 | Tao | H01Q 9/42 |
| 2024/0178163 | A1* | 5/2024 | Tang | H10W 44/20 |

OTHER PUBLICATIONS

PCT International Application No. PCT/KR2022/008975, International Search Report dated Mar. 21, 2023, 4 pages.

* cited by examiner (a)

(b)

(a)

(b)

(a)

(a)

(b)

(a)

(b)

(a)

(b)

(a)

(b)

(a)

(b)

(a)

(b)

(a)

(b)

(c)

ARRAY ANTENNA AND ELECTRONIC DEVICE COMPRISING SAME

CROSS-REFERENCE TO RELATED APPLICATION

This application is the National Stage filing under 35 U.S.C. 371 of International Application No. PCT/KR2022/008975, filed on Jun. 23, 2022, the contents of which is hereby incorporated by reference herein in its entirety.

TECHNICAL FIELD

The disclosure relates to an array antenna and an electronic device including the same. One or more embodiments relates to an antenna module including an array antenna implemented in a multi-layered structure and an electronic device including the same.

BACKGROUND ART

As functions of electronic devices diversify, the electronic devices may be implemented as image display devices such as multimedia players having complex functions, for example, playing music or video files, playing games, receiving broadcasts, and the like.

An image display device is a device for reproducing (playing) image contents. Image display devices receive images (videos) from various sources and reproduce the received images. Image display devices are implemented as various devices such as personal computers (PC), smart phones, tablet PCs, laptop computers, TV sets, and the like. An image display device, such as a smart TV, may provide an application for providing web contents, such as web browsers.

An electronic device, such as the image display device, may include a communication module having antennas to perform communications with neighboring electronic devices. Meanwhile, as a display area (region) of an image display device is expanded recently, an arrangement space of a communication module including antennas is reduced. This causes an increase in necessity of arranging antennas inside a multi-layered circuit board on which the communication module is implemented.

A WiFi radio interface may be considered as an interface for a communication service between electronic devices. When using such a WiFi radio interface, a millimeter wave (mmWave) band may be used for high-speed data transmission between the electronic devices. For example, the high-speed data transmission between the electronic devices is achieved using a radio interface, such as 802.11ay.

In this regard, an array antenna that may operate in a millimeter wave (mmWave) band may be mounted in an antenna module. An antenna module implemented as an array antenna may be configured such that antenna elements are adjacent to each other at a certain gap or less for beamforming. However, there is a problem in that interference between antenna elements may increase as the gap between the antenna elements decreases.

In the antenna module implemented as the array antenna, there is a problem in that unnecessary side radiation components increase and antenna efficiency decreases due to surface wave components through a dielectric region between the antenna elements. The side radiation may cause a decrease in directivity in a front direction of the antenna.

There is also a problem of a narrow operating bandwidth in a planar antenna element, such as a patch antenna element. Therefore, an antenna structure, which achieves high antenna efficiency while operating as a broadband antenna for providing a broadband service in a millimeter wave (mmWave) band, is required.

DISCLOSURE OF INVENTION

Technical Problem

One aspect of the specification is to solve the aforementioned problems and other drawbacks. Another aspect of the disclosure is to improve antenna efficiency in a broadband antenna module, which operates in a millimeter wave (mmWave) band.

Still another aspect of the disclosure is to improve efficiency and a directivity in a front direction of an antenna element, which operates in an mmWave band.

Still another aspect of the disclosure is to propose an antenna structure, which achieves high antenna efficiency while operating as a broadband antenna for providing a broadband service in an mmWave band.

Still another aspect of the disclosure is to obtain high antenna gains and improve in an mmWave band and improve antenna gain flatness over a whole frequency band.

Solution to Problem

To achieve these and other advantages and in accordance with the purpose of the present disclosure, as embodied and broadly described herein, there is provided an antenna module of an electronic device, the antenna module being implemented as a phased array antenna implemented on a dielectric substrate. The dielectric substrate may include: a first layer having a first conductive layer including a first opening and a second opening on a surface of the dielectric substrate; a second layer having a second conductive layer including a fourth opening and a fifth opening in the dielectric substrate; and a third layer having a third conductive layer including a third opening in the dielectric substrate. The antenna module may include a dielectric cover layer; and a dielectric substrate having a surface mounted to face the dielectric cover layer.

As an embodiment, a first part of the first conductive layer may be disposed between the first opening and the second opening, and a second part of the first conductive layer may be disposed to face the first part of the first conductive layer in a vicinity of the first opening. A first part of the second conductive layer may be disposed between the fourth opening and the fifth opening, and a second part of the second conductive layer may face the first part of the second conductive layer in a vicinity of the fourth opening.

As an embodiment, the dielectric substrate may include a fourth layer having a plurality of conductive traces; a fifth layer having a fourth conductive layer configured to operate as ground. The dielectric substrate may include the phased array antenna on the dielectric substrate.

As an embodiment, the phased array antenna may include a plurality of patch elements on the surface of the dielectric substrate and transmission line paths coupled to positive antenna feed terminals on the plurality of patch elements in the dielectric substrate. The phased array antenna may be configured to transmit radio-frequency signals at a frequency between 10 GHz and 300 GHz through the dielectric cover layer. The plurality of patch elements may be placed in the second opening of the first conductive layer. The transmission line paths may be arranged in the fifth opening of the second layer and the third opening of the third layer.

As an embodiment, the first part of the first conductive layer, the first part of the second conductive layer, and a first part of the third conductive layer may be connected to each other by first conductive vias. The second part of the first conductive layer, the second part of the second conductive layer, and a second part of the third conductive layer may be connected to each other by second conductive vias. A third part of the third conductive layer may overlap the first opening and the fourth opening. The first conductive vias and the second conductive vias may be electrically connected to the third part of the third conductive layer.

As an embodiment, the second layer may include a plurality of layers in the dielectric substrate.

As an embodiment, a length of a long side of the second opening may be equal to or greater than a length of a long side of the first opening.

As an embodiment, an interval distance h1 from a surface of the first layer to a surface of the third layer may be equal to or greater than $0.02\lambda_0$.

As an embodiment, an interval distance d from an edge of the first opening to an edge of the second opening may be equal to or greater than $0.13\lambda_0$.

As an embodiment, a length W1 of a long side of the first opening is equal to or greater than 2. A length L1 of a short side of the first opening may be equal to or greater than $0.13\lambda_0$.

As an embodiment, the antenna module may further include a plurality of dummy patterns arranged in the first opening on the dielectric substrate. A first side value L2 of the plurality of dummy patterns may be configured such that $0<L2<L1$. A second side value W2 of the plurality of dummy patterns may be configured such that $0<W2<W1$.

As an embodiment, the antenna module may further include a plurality of dummy patterns arranged in the third opening on the dielectric substrate. A first side value L2 of the plurality of dummy patterns may be configured such that $0<L2<L1$. A second side value W2 of the plurality of dummy patterns may be configured such that $0<W2<W1$.

As an embodiment, the antenna module may further include a plurality of first dummy patterns arranged in the first opening on the dielectric substrate; and a plurality of second dummy patterns arranged in the third opening on the dielectric substrate. The plurality of first dummy patterns may be electrically connected to the plurality of second dummy patterns through vertical conductive vias.

As an embodiment, the first opening may be arranged in an electric field direction of the phased array antenna.

As an embodiment, the first layer having the first conductive layer may further include a sixth opening in the surface of the dielectric substrate. A third part of the first conductive layer may be disposed between the second opening and the sixth opening. A fourth part of the first conductive layer may be disposed to face the third part of the first conductive layer.

As an embodiment, the second layer having the second conductive layer may further include a seventh opening in the surface of the dielectric substrate. A third part of the second conductive layer may be disposed between the fifth opening and the seventh opening. The fourth part of the first conductive layer may be disposed to face the third part of the second conductive layer in a vicinity of the seventh opening.

As an embodiment, the third part of the first conductive layer, the third part of the second conductive layer, and a fifth part of the third conductive layer may be connected to each other by third conductive vias. The fourth part of the first conductive layer, a fourth part of the second conductive layer, and a sixth part of the third conductive layer may be connected to each other by fourth conductive vias. A fourth part of the third conductive layer may overlap the sixth opening and the seventh opening. The third conductive vias and the fourth conductive vias may be electrically connected to the fourth part of the third conductive layer.

According to another aspect of the disclosure, there is also provided an antenna module of an electronic device, the antenna module being implemented as a phased array antenna implemented on a dielectric substrate. The dielectric substrate may include: a first layer having a first conductive layer including a first opening and a second opening on a surface of the dielectric substrate; a second layer having a second conductive layer including a fourth opening and a fifth opening in the dielectric substrate; and a third layer having a third conductive layer including a third opening in the dielectric substrate. The phased array antenna may include parasitic patch elements on the surface of the dielectric substrate, patch elements in the dielectric substrate, and transmission line paths coupled to positive antenna feed terminals on the patch elements in the dielectric substrate, respectively.

As an embodiment, the antenna module may include a dielectric cover layer; and a dielectric substrate having a surface mounted to face the dielectric cover layer.

As an embodiment, a first part of the first conductive layer may be disposed between the first opening and the second opening, and a second part of the first conductive layer may face the first part of the first conductive layer in a vicinity of the first opening. A first part of the second conductive layer may be disposed between the fourth opening and the fifth opening, and a second part of the second conductive layer may be disposed to face the first part of the second conductive layer in a vicinity of the fourth opening.

As an embodiment, the dielectric substrate may include a fourth layer having a plurality of conductive traces; and a fifth layer having a fourth conductive layer configured to operate as ground. The dielectric substrate may include a phased array antenna on the dielectric substrate.

As an embodiment, the phased array antenna may a plurality of patch elements on a surface of the dielectric substrate and transmission line paths coupled to positive antenna feed terminals on the plurality of patch elements in the dielectric substrate. The phased array antenna may be configured to transmit radio-frequency signals at a frequency between 10 GHz and 300 GHz through the dielectric cover layer. The plurality of patch elements may be placed in the second opening of the first conductive layer, and the transmission line paths may be arranged in the fifth opening of the second layer and the third opening of the third layer.

As an embodiment, the first part of the first conductive layer, the first part of the second conductive layer, and a first part of the third conductive layer may be connected to each other by first conductive vias. The second part of the first conductive layer, the second part of the second conductive layer, and a second part of the third conductive layer may be connected to each other by second conductive vias. A third part of the third conductive layer may overlap the first opening and the fourth opening. The first conductive vias and the second conductive vias may be electrically connected to the third part of the third conductive layer.

According to still another aspect of the disclosure, there is also provided an antenna module of an electronic device, the antenna module being implemented as a phased array antenna implemented on a dielectric substrate. The dielectric substrate may include: a first layer having a first conductive layer including a first opening, a second opening, and a sixth opening on a surface of the dielectric substrate; a second layer having a second conductive layer including a fourth opening, a fifth opening, and a seventh opening in the dielectric substrate; and a third layer having a third conductive layer including a third opening in the dielectric substrate. The antenna module may include: a dielectric cover layer; and a dielectric substrate having a surface mounted to face the dielectric cover layer. The phased array antenna may include a plurality of patch elements on the surface of the dielectric substrate and transmission line paths coupled to positive antenna feed terminals on the plurality of patch elements in the dielectric substrate.

As an embodiment, a first part of the first conductive layer may be disposed between the first opening and the second opening, and a second part of the first conductive layer may be disposed to face a first part of the first conductive layer in a vicinity of the first opening. A third part of the first conductive layer may be disposed between the second opening and the sixth opening, and a fourth part of the first conductive layer may be disposed to face the third part of the first conductive layer in a vicinity of the sixth opening. A first part of the second conductive layer may be disposed between the fourth opening and the fifth opening, and a second part of the second conductive layer may be disposed to face the first part of the second conductive layer in a vicinity of the fourth opening. A third part of the second conductive layer may be disposed between the fourth opening and the seventh opening, and the fourth part of the first conductive layer may be disposed to face the third part of the second conductive layer in a vicinity of the seventh opening.

As an embodiment, the dielectric substrate may include: a fourth layer having a plurality of conductive traces; and a fifth layer having a fourth conductive layer configured to operate as ground. The dielectric substrate may include a phased array antenna on the dielectric substrate.

As an embodiment, the phased array antenna may include a plurality of patch elements on the surface of the dielectric substrate and transmission line paths coupled to positive antenna feed terminals on the plurality of patch elements in the dielectric substrate. The phased array antenna may be configured to transmit radio-frequency signals at a frequency between 10 GHz and 300 GHz through the dielectric cover layer. The patch elements may be placed in the second opening of the first conductive layer, and the transmission line paths may be arranged in the fifth opening of the second layer and the third opening of the third layer.

As an embodiment, the first part of the first conductive layer, the first part of the second conductive layer, and a first part of the third conductive layer may be connected to each other by first conductive vias. The second part of the first conductive layer, the second part of the second conductive layer, and a second part of the third conductive layer may be connected to each other by second conductive vias. A third part of the third conductive layer may overlap the first opening and the fourth opening. The first conductive vias and the second conductive vias may be electrically connected to the third part of the third conductive layer.

As an embodiment, the third part of the first conductive layer, the third part of the second conductive layer, and a fourth part of the third conductive layer may be connected to each other by third conductive vias. The fourth part of the first conductive layer, a fourth part of the second conductive layer, and a sixth part of the third conductive layer may be connected to each other by fourth conductive vias. The sixth part of the third conductive layer overlaps the sixth opening and the seventh opening. The third conductive vias and the fourth conductive vias may be electrically connected to the sixth part of the third conductive layer.

As an embodiment, the electronic device may include a display having a first surface and a second surface, and including a pixel circuit configured to emit light through a display cover layer and the dielectric cover layer. The display cover layer may constitute the first surface of the electronic device, and the dielectric cover layer may be disposed adjacent to the display cover layer.

As an embodiment, The first patch element and the second patch element may be in direct contact with the surface of the dielectric cover layer.

As an embodiment, the electronic device may further include an adhesive layer configured to attach the dielectric substrate to the dielectric cover layer. The first patch element and the second patch element may be disposed to be in direct contact with the adhesive layer.

As an embodiment, the dielectric cover layer may have a first dielectric constant, and the adhesive layer may be configured to have a second dielectric constant lower than the first dielectric constant.

According to an embodiment, the radio frequency signals at the frequency may indicate an effective wavelength when propagating through the dielectric cover layer, and the dielectric cover layer may be configured to have a thickness between 0.15 and 0.3 times the effective wavelength.

As an embodiment, the dielectric cover layer may have a dielectric constant between 3.0 and 10.0.

Advantageous Effects of Invention

Hereinafter, technical effects of an antenna module operating in a millimeter wave (mmWave) band and an electronic device having the same will be described.

According to an embodiment, antenna efficiency may be improved through a slot wall structure, which is formed between antenna elements in a broadband antenna module operating in an mmWave band.

According to an embodiment, a slot wall structure, which is formed between antenna elements in a broadband antenna module operating in an mmWave band, may be formed as a via structure on a multi-layered substrate, thereby improving antenna efficiency.

According to an embodiment, a slot wall structure may suppress side radiation components, thereby improving efficiency and directivity in a front direction of an antenna element operating in an mmWave band.

According to an embodiment, an antenna structure, which achieves high antenna efficiency while operating as a broadband antenna for providing a broadband service in an mmWave band, may be provided through a stacked antenna structure and a slot wall structure.

According to an embodiment, an antenna structure having improved antenna gain flatness over a whole frequency band with a high antenna gain in a mmWave band may be provided through a structure of a slot wall and a dummy pattern inside the slot wall.

Further scope of applicability of the disclosure will become apparent from the following detailed description. It should be understood, however, that the detailed description and specific examples, such as the preferred embodiments, are given by way of illustration only, because various changes and modifications within the technical idea and scope of the disclosure will be apparent to those skilled in the art.

MODE FOR THE INVENTION

Figure 1:
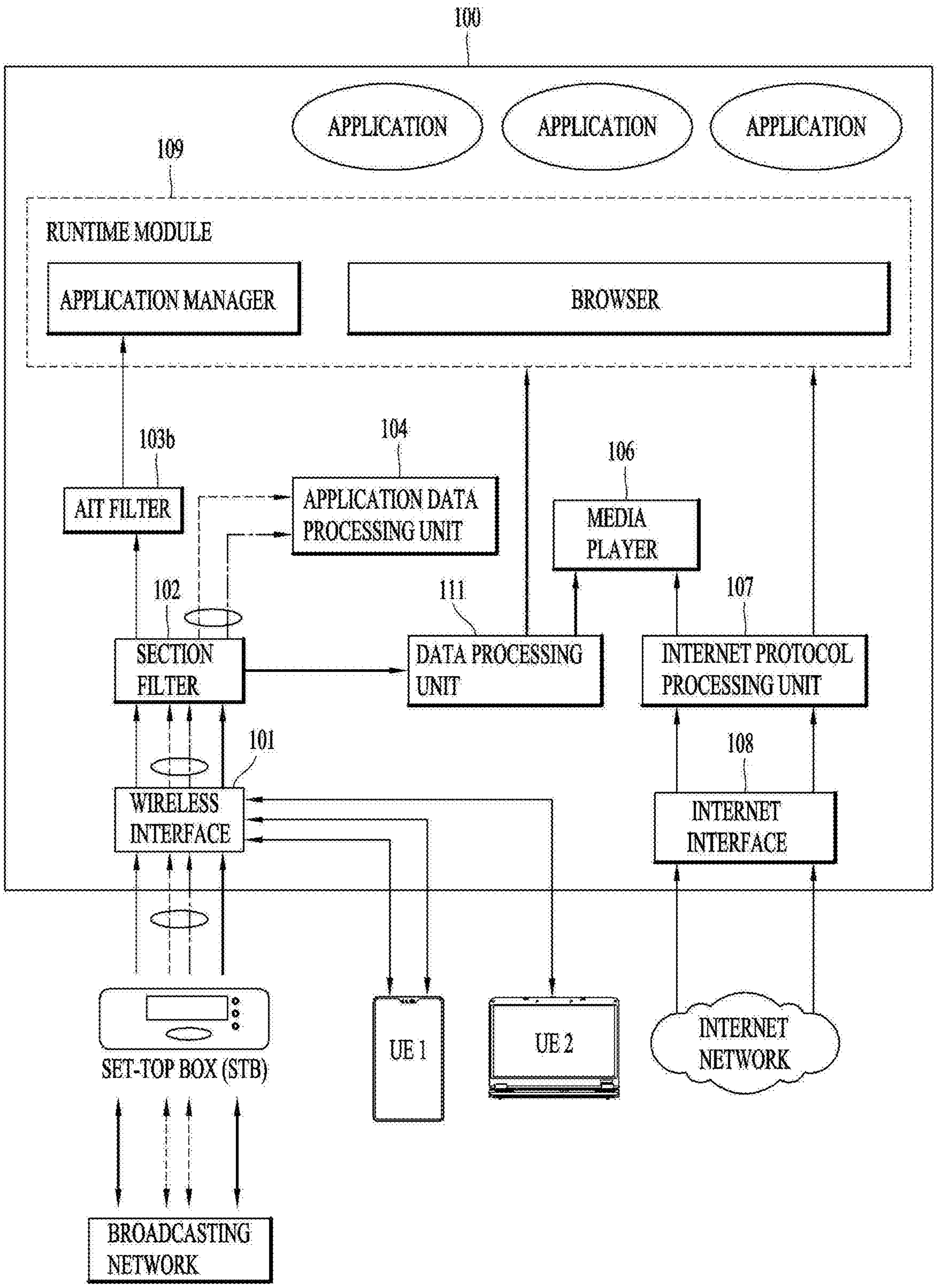
FIG. 1 is a schematic view of an example of an entire wireless AV system including an image display device according to an embodiment of the disclosure.

A description will now be given in detail according to one or more embodiments disclosed herein, with reference to the accompanying drawings. For the sake of a brief description with reference to the drawings, the same or like components may be assigned the same reference numeral, regardless of the numerals in the drawings, and a redundant description thereof will be omitted. Suffixes "module" and "unit" used for components used in the following description are merely intended for easy description of the specification, and each suffix itself is not intended to give any special meaning or function. In describing the embodiments disclosed herein, moreover, the detailed description will be omitted when a specific description for publicly known technologies to which the disclosure pertains is judged to obscure the gist of the disclosure. The accompanying drawings are used to help easily understand the technical idea of the disclosure and it should be understood that the idea of the disclosure is not limited by the accompanying drawings. The idea of the present disclosure should be construed to extend to any alterations, equivalents, and substitutes besides the accompanying drawings.

It will be understood that although the terms first, second, and the like may be used herein to describe various elements, these elements should not be limited by these terms. These terms are generally only used to distinguish one element from another.

It will be understood that when an element is referred to as being "connected with" another element, the element may be connected with the another element or intervening elements may also be present. In contrast, when an element is referred to as being "directly connected with" another element, there are no intervening elements present.

The singular forms are intended to include the plural forms as well, unless the context clearly indicates otherwise.

Terms "include" or "has" as used herein should be understood that they are intended to indicate the existence of a feature, a number, a step, an element, a component, or a combination thereof disclosed in the specification, and it may also be understood that the existence or additional possibility of one or more other features, numbers, steps, elements, components, or combinations thereof are not excluded in advance.

Electronic devices described herein may be implemented using a variety of different types of terminals. Examples of such devices may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings may be equally applied to other types of terminals, such as those types noted above.

In addition, these teachings may also be applied to stationary terminals, such as digital TV, desktop computers, digital signages, and the like.

FIG. 1 is a schematic view of an example of an entire wireless AV system including an image display device according to an embodiment of the disclosure.

As illustrated in FIG. 1, an image display device 100 according to another embodiment may be connected to a wireless AV system (or a broadcasting network) and an Internet network. The image display device 100 may be, for example, a network TV, a smart TV, a hybrid broadcast broadband TV (HBBTV), or the like.

The image display device 100 may be wirelessly connected to the wireless AV system (or the broadcasting network) via a wireless interface or wirelessly or wiredly connected to the Internet network via an Internet interface. In relation to this, the image display device 100 may be connected to a server or another electronic device via a wireless communication system. As an example, the image display device 100 needs to provide an 802.11ay communication service which operates in a millimeter wave (mmWave) band to transmit or receive large-capacity data at a high speed.

The mmWave band may be an arbitrary frequency band in a range of 10 GHz to 300 GHz. In this disclosure, the mmWave band may include an 802.11ay band of a 60 GHz band. For example, the mmWave band may include a 5G frequency band of a 28 GHz band or the 802.11ay band of the 60 GHz band. A 5G frequency band may be set to a band of about 24 to 43 GHz and the 802.11ay band may be set to a band of 57 to 70 GHz or 57 to 63 GHz, but are not limited thereto.

The image display device 100 may wirelessly transmit or receive data to/from an electronic device in the vicinity of the image display device 100, e.g., a set-top box or another electronic device, via a wireless interface. As an example, the image display device 100 may transmit or receive wireless AV data to/from a set-top box or another electronic device, e.g., a mobile terminal, which is arranged in front of or below the image display device 100.

The image display device 100 may include, for example, a wireless interface 101*b*, a section filter 102*b*, an application information table (AIT) filter 103*b*, an application data processing unit 104*b*, a data processing unit 111*b*, a media player 106*b*, an Internet protocol processing unit 107*b*, an Internet interface 108*b*, and a runtime module 109*b*.

Application information table (AIT) data, real-time broadcast content, application data, and a stream event may be received through a broadcast interface 101*b*. In some embodiments, the real-time broadcast content may be referred to as linear audio/video (A/V) content.

The section filter 102*b* may perform section filtering on four types of data received through the wireless interface 101*b* to transmit the AIT data to the AIT filter 103*b*, the linear A/V content to the data processing unit 111*b*, and the stream event and the application data to the application data processing unit 104*b*.

Non-linear A/V content and the application data may be received through the Internet interface 108*b*. The non-linear A/V content may also be, for example, a content on demand (COD) application. The non-linear A/V content may be transmitted to the media player 106*b*, and the application data may be transmitted to the runtime module 109*b*.

Further, the runtime module 109*b* may include, for example, an application manager and a browser as illustrated in FIG. 1. The application manager may control a life cycle of an interactive application using, for example, the AIT data. The browser may perform, for example, a function of displaying and processing the interactive application.

Hereinafter, a communication module, which includes an antenna for providing a wireless interface in an electronic device such as the above-described image display device, will be described in detail. In relation to this, the wireless interface for communication between electronic devices may be a WiFi wireless interface, but is not limited thereto. As an example, a wireless interface supporting the 802.11ay standard may be provided for high-speed data transmission between electronic devices.

The 802.11ay standard is a successor standard for raising a throughput for the 802.11ad standard to 20 Gbps or greater. An electronic device supporting the 802.11ay wireless interface may be configured to use a frequency band of about 57 to 64 GHz. The 802.11ay wireless interface may be configured to provide backward compatibility for an 802.11ad wireless interface. The electronic device providing the 802.11ay wireless interface may be configured to provide coexistence with a legacy device using the same band.

In relation to a wireless environment for the 802.11ay standard, a coverage of 10 meters or longer in an indoor environment and a coverage of 100 meters or longer in an outdoor environment with a line of sight (LOS) channel condition may be secured.

The electronic device supporting the 802.11ay wireless interface may be configured to provide visual reality (VR) headset connectivity, support server backups, and support cloud applications that require low latency.

An ultra-short range (USR) communication scenario, i.e., a near field communication scenario which is a use case of the 802.11ay wireless interface, is a model for fast large-capacity data exchange between two terminals. The USR communication scenario may be configured to require low power consumption of less than 400 mW, while providing a fast link setup within 100 msec, transaction time within 1 second, and a data rate of 10 Gbps at a very short distance of less than 10 cm.

As the use case of the 802.11ay wireless interface, an 8K UHD wireless transfer at a smart home usage model may be taken into account. In the smart home usage model, a wireless interface between a source device and a sync device may be taken into consideration to stream 8K UHD content at home. In relation to this, the source device may be one of a set-top box, a Blue-ray player, a tablet PC, or a smart phone, and the sink device may be one of a smart TV or a display device, but are not limited thereto. In relation to this, the wireless interface may be configured to transmit uncompressed 8K UHD streaming data (60 fps, 24 bits per pixel, at least 4:2:2) with a coverage of less than 5 m between the source device and the sink device. To this end, the wireless interface may be configured such that data is transmitted between electronic devices at a speed of at least 28 Gbps.

In order to provide such a wireless interface, embodiments related to an array antenna operating in an mmWave band and an electronic device including the array antenna will be described with reference to the accompanying drawings. It will be apparent to those skilled in the art that the disclosure may be embodied in other specific forms without departing from the spirit or essential characteristics of the disclosure.

Figure 2:
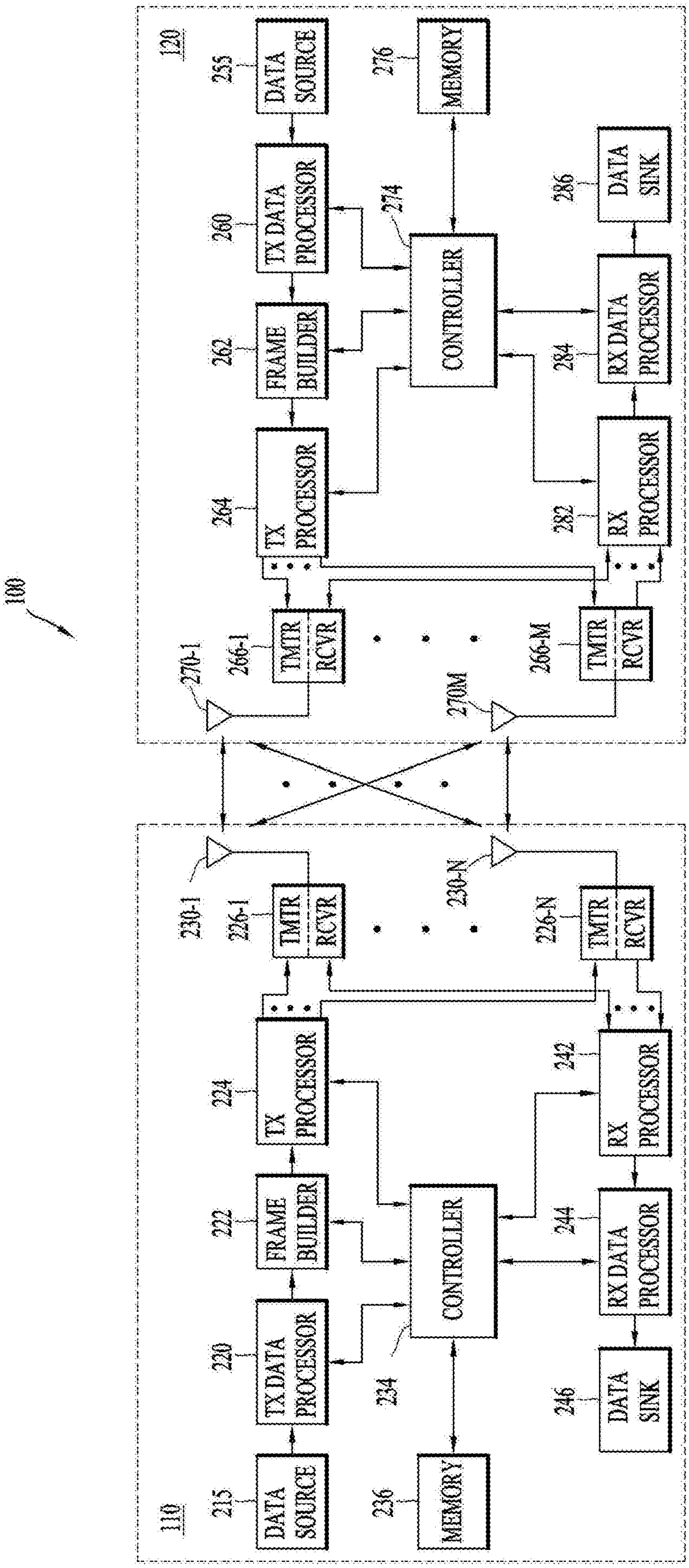
FIG. 2 is a view of a detailed configuration of electronic devices which support radio interfaces according to the disclosure.

FIG. 2 is a view of a detailed configuration of electronic devices which support radio interfaces according to the disclosure. FIG. 2 is a block diagram of an access point 110 (generally, a first wireless node) and an access terminal 120 (generally, a second wireless node) in a wireless communication system. The access point 110 may be a transmitting entity for downlink transmission and a receiving entity for uplink transmission. The access terminal 120 may be a transmitting entity for uplink transmission and a receiving entity for downlink transmission. As used herein, the "transmitting entity" is an independently operating apparatus or device capable of transmitting data through a wireless channel, and the "receiving entity" is an independently operating apparatus or device capable of receiving data through a wireless channel.

Referring to FIGS. 1 and 2, the set-top box (STB) of FIG. 1 may be the access point 110, and an electronic device, that is, the image display device 100 of FIG. 1 may be the access terminal 120, but are not limited thereto. Accordingly, it should be understood that the access point 110 may alternatively be an access terminal, and the access terminal 120 may alternatively be an access point.

To transmit data, the access point 110 may include a transmission (TX) data processor 220, a frame builder 222, a TX processor 224, a plurality of transceivers 226-1 to 226-N, and a plurality of antennas 230-1 to 230-N. The access point 110 may also include a controller 234 configured to control operations of the access point 110.

To transmit data, the access point 110 may include a transmission (TX) data processor 220, a frame builder 222, a TX processor 224, a plurality of transceivers 226-1 to 226-N, and a plurality of antennas 230-1 to 230-N. The access point 110 may also include a controller 234 configured to control operations of the access point 110.

During operation, the TX data processor 220 may receive data (e.g., data bits) from a data source 215, and process the data for transmission. For example, the TX data processor 220 may encode data (e.g., data bits) into encoded data, and modulate the encoded data into data symbols. The TX data processor 220 may support different modulation and coding schemes (MCSs). For example, the TX data processor 220 may encode data at any one of a plurality of different coding rates (e.g., using low-density parity check (LDPC) encoding). In addition, the TX data processor 220 may modulate the encoded data using any one of a plurality of different modulation schemes including, but not limited to, BPSK, QPSK, 16QAM, 64QAM, 64APSK, 128APSK, 256QAM, and 256APSK.

The controller 234 may transmit, to the TX data processor 220, a command for specifying an MCS to be used (e.g., on the basis of channel conditions for downlink transmission). The TX data processor 220 may encode and modulate the data received from the data source 215 according to the specified MCS. It needs to be recognized that the TX data processor 220 may perform additional processing on the data, for example, data scrambling and/or other processing. The TX data processor 220 may output the data symbols to the frame builder 222.

The frame builder 222 may construct a frame (also referred to as a packet) and insert the data symbols into a data payload of the frame. The frame may include a preamble, a header, and a data payload. The preamble may include a short training field (STF) sequence and a channel estimation (CE) sequence to assist the access terminal 120 in receiving the frame. The header may include information regarding data in a payload, such as a length of the data and an MCS used to encode and modulate the data. Based on this information, the access terminal 120 may demodulate and decode the data. The data in the payload may be partitioned among a plurality of blocks, and each block may contain a part of the data and a guard interval (GI) to assist the receiver in phase tracking. The frame builder 222 outputs the frame to the TX processor 224.

The TX processor 224 processes the frame for transmission on downlink. For example, the TX processor 224 may support different transmission modes, e.g., an orthogonal frequency-division multiplexing (OFDM) transmission mode and a single-carrier (SC) transmission mode. In this example, the controller 234 may transmit, to the TX processor 224, a command for specifying a transmission mode to be used, and the TX processor 224 may process the frame for transmission according to the specified transmission mode. The TX processor 224 may apply a spectrum mask to the frame so that a frequency configuration of a downlink signal complies with particular spectrum requirements.

The TX processor 224 may support multiple-input-multiple-output (MIMO) transmission. In these aspects, the access point 110 may include a plurality of antennas 230-1 to 230-N and a plurality of transceivers 226-1 to 226-N (e.g., one for each antenna). The TX processor 224 may perform spatial processing on incoming frames and provide a plurality of transmission frame streams to a plurality of antennas. The transceivers 226-1 to 226-N receive and process (e.g., convert to analog, amplify, filter, and frequency up-convert) each of the transmission frame streams to generate transmission signals for transmission through the antennas 230-1 to 230-N.

To transmit data, the access terminal 120 includes a TX data processor 260, a frame builder 262, a TX processor 264, a plurality of transceivers 266-1 to 266-M, and a plurality of antennas 270-1 to 270-M (e.g., one antenna per transceiver). The access terminal 120 may transmit data to the access point 110 on uplink and/or transmit the data to another access terminal (e.g., for peer-to-peer communication). The access terminal 120 also includes a controller 274 configured to control operations of the access terminal 120.

The transceivers 266-1 to 266-M receive and process (e.g., convert to analog, amplify, filter, and frequency up-convert) an output from the TX processor 264 for transmission via one or more of the antennas 270-1 to 270-M. For example, the transceiver 266-1 may up-convert the output from the TX processor 264 into a transmission signal having a frequency in a 60 GHz band. Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 270-1 to 270-M and the transceivers 266-1 to 266-M may be implemented in an integrated form on a multi-layer circuit substrate. To do so, among the antennas 270-1 to 270-M, an antenna configured to operate with vertical polarization may be vertically arranged inside the multi-layer circuit substrate.

To receive data, the access point 110 includes a reception (RX) processor 242 and an RX data processor 244. During operation, the transceivers 226-1 to 226-N receive a signal (e.g., from the access terminal 120) and spatially process (e.g., frequency down-convert, amplify, filter, and digitally convert) the received signal.

The RX processor 242 receives outputs from the transceivers 226-1 through 226-N and processes the outputs to recover data symbols. For example, the access point 110 may receive data from a frame (e.g., from the access terminal 120). In this example, the RX processor 242 may detect a start of the frame using a short training field (STF) sequence in a preamble of the frame. The RX processor 242 may also use the STF for automatic gain control (AGC) adjustment. The RX processor 242 may also perform channel estimation (e.g., using a channel estimation (CE)

sequence in the preamble of the frame), and perform channel equalization on the received signal based on the channel estimation.

The RX data processor 244 receives data symbols from the RX processor 242 and an indication of a corresponding MSC scheme from the controller 234. The RX data processor 244 demodulates and decodes the data symbols, recovers the data according to the indicated MSC scheme, and stores and/or outputs the recovered data (e.g., data bits) to a data sink 246 for additional processing.

The access terminal 120 may transmit the data using an orthogonal frequency-division multiplexing (OFDM) transmission mode or a single-carrier (SC) transmission mode. In this case, the RX processor 242 may process the received signal according to a selected transmission mode. In addition, as described above, the TX processor 264 may support MIMO transmission. In this case, the access point 110 includes the antennas 230-1 to 230-N and the transceivers 226-1 to 226-N (e.g., one for each antenna). Accordingly, the antenna module described herein may be configured to perform a beamforming operation in the 60 GHz band, for example, in a band of about 57 to 63 GHz. In addition, the antenna module may be configured to support MIMO transmission while performing beamforming in the 60 GHz band.

In relation to this, the antennas 230-1 to 230-M and the transceivers 226-1 to 226-M may be implemented in an integrated form on a multi-layer circuit substrate. To do so, among the antennas 230-1 to 230-M, an antenna configured to operate with vertical polarization may be vertically arranged inside the multi-layer circuit substrate.

Meanwhile, each transceiver receives and processes (e.g., frequency down-converts, amplifies, filters, and digitally converts) a signal from each antenna. The RX processor 242 may perform spatial processing on the outputs from the transceivers 226-1 to 226-N to recover the data symbols.

The access point 110 also includes a memory 236 coupled to the controller 234. The memory 236 may store commands that, when executed by the controller 234, cause the controller 234 to perform one or more of the operations described herein. Similarly, the access terminal 120 also includes a memory 276 coupled to the controller 274. The memory 276 may store commands that, when executed by the controller 274, cause the controller 274 to perform one or more of the operations described herein.

Figure 3A:
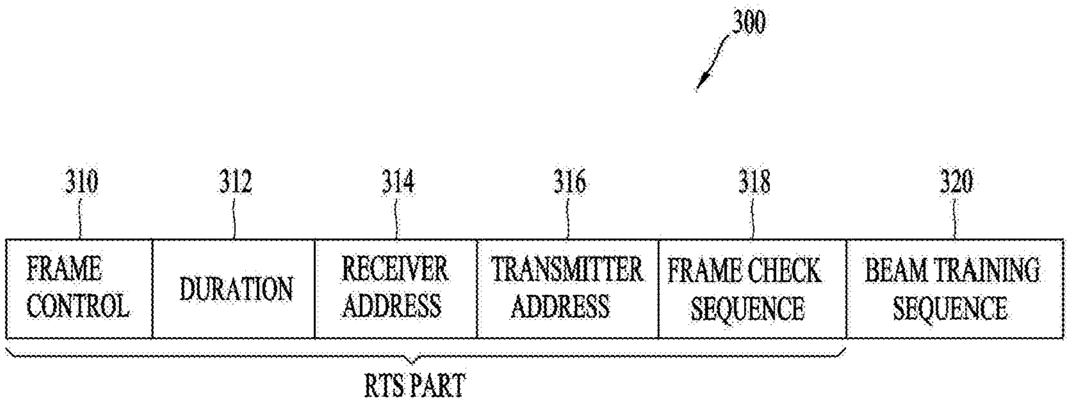
FIG. 3A is a view of a request to send (RTS) and a clear to send (CTS) according to the disclosure.
Figure 3A:
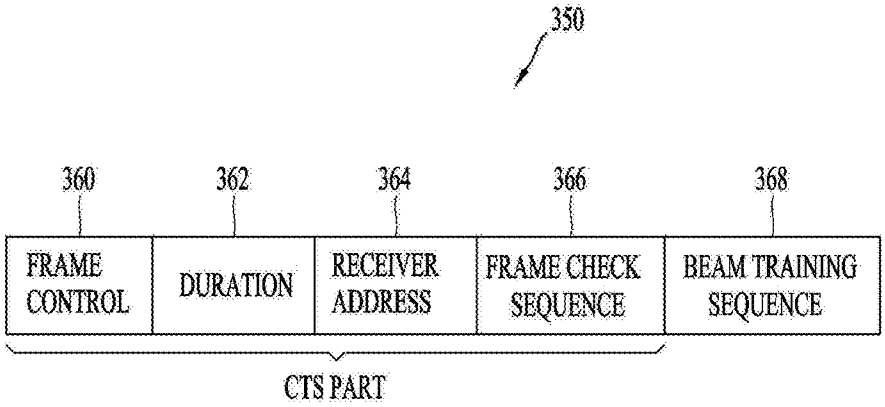

Meanwhile, an electronic device supporting 802.11ay wireless interface according to the present disclosure determines whether or not a communication medium is available to communicate with other electronic devices. To this end, the electronic device transmits a Request to Send (RTS)-TRN frame including an RTS part and a first beam training sequence. In this regard, FIG. 3A illustrates a Request to Send (RTS) and a Clear to Send (CTS) according to the present disclosure. A transmitting device may use an RTS frame to determine whether a communication medium is available to transmit one or more data frames to a destination device. In response to the reception of the RTS frame, the destination device transmits a CTS frame to the transmitting device when the communication medium is available. In response to the reception of the CTS frame, the transmitting device transmits the one or more data frames to the destination device. In response to the successful reception of the one or more data frames, the destination device transmits one or more acknowledgment ("ACK") frames to the transmitting device.

Referring to (a) of FIG. 3A, a frame 300 includes an RTS part including a frame control field 310, a duration field 312, a receiver address field 314, a transmitter address field 316, and a frame check sequence field 318. For the purpose of improved communication and interference reduction, the frame 300 further includes a beam training sequence field 320 to configure antennas of a destination device and one or more neighboring devices, respectively.

Referring to (b) of FIG. 3A, a CTS frame 350 includes a CTS part including a frame control field 360, a duration field 362, a receiver address field 314, and a frame check sequence field 366. For the purpose of improved communication and interference reduction, the frame 350 further includes a beam training sequence field 368 to configure antennas of a transmitting device and one or more neighboring devices, respectively.

The beam training sequence fields 320 and 368 may comply with the training (TRN) sequence in accordance with IEEE 802.11ad or 802.11ay. The transmitting device may use the beam training sequence field 368 to configure its antenna for directional transmission to the destination device. On the other hand, the transmitting devices may use the beam training sequence field to configure their own antennas to reduce transmission interference at the destination device. In this case, the transmitting devices may use the beam training sequence field to configure their own antennas to generate antenna radiation patterns with nulls aimed at the destination device.

Figure 3B:
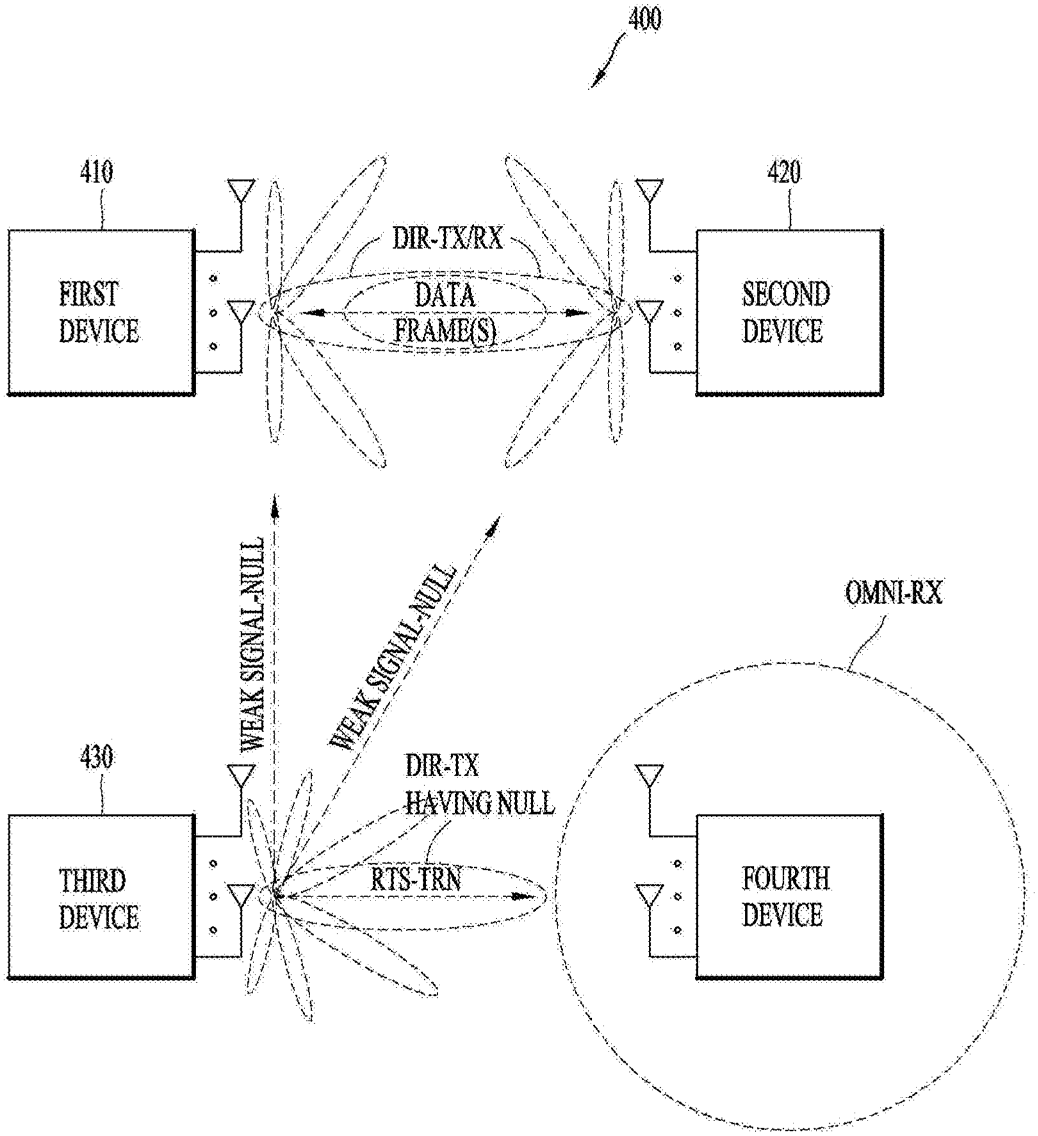
FIG. 3B is a block diagram of a communication system 400 according to an example of the disclosure.

Therefore, electronic devices supporting 802.11ay wireless interface may form initial beams to have a low interference level therebetween using beamforming patterns determined according to the beam training sequence. In this regard, FIG. 3B is a block diagram illustrating a communication system 400 according to an example of the present disclosure. As illustrated in FIG. 3B, first and second devices 410 and 420 may improve communication performance by matching directions of main beams. On the other hand, the first and second devices 410 and 420 may form signal-null having weak signal intensity in a specific direction, in order to reduce interference with a third device 430.

In relation to the formation of the main beam and the signal-null, a plurality of electronic devices according to the present disclosure may perform beamforming through array antennas. Referring to FIG. 3B, some of the plurality of electronic devices may alternatively be configured to perform communication with an array antenna of another electronic device through a single antenna. In this regard, when performing communication through the single antenna, a beam pattern is formed as an omnidirectional pattern.

Referring to FIG. 3B, the first to third devices 410 to 430 perform beamforming but a fourth device 440 does not perform beamforming, but the present disclosure is not limited thereto. Therefore, it may alternatively be configured such that three of the first to fourth devices 410 to 440 perform beamforming and the other may not perform beamforming.

As another example, it may be configured such that any one of the first to fourth devices 410 to 440 performs beamforming and the remaining three devices do not perform beamforming. As still another example, it may be configured such that two of the first to fourth devices 410 to 440 perform beamforming and the remaining two devices do not perform beamforming. As still another example, all the first to fourth devices 410 to 440 may be configured to perform beamforming.

Referring to FIGS. 3A and 3B, the first device 410 determines that it is an intended receiving device of the CTS-TRN frame 350 on the basis of an address displayed on the receiver address field 364 of the CTS-TRN frame 350.

In response to the determination as the intended receiving device of the CTS-TRN frame 350, the first device 410 may use the beam training sequence of the beam training sequence field 368 of the received CTS-TRN 350 to configure its own antenna for a directional transmission substantially and selectively aimed at the second device 420. That is, the antenna of the first device 410 is configured to generate a primary lobe (e.g., highest gain lobe) substantially aimed at the second device 420, and an antenna radiation pattern with non-primary lobes aimed at other directions.

The second device 420 already knows the direction toward the first device 410 based on the beam training sequence of the beam training sequence field 320 of the previously-received RTS-TRN frame 300. Therefore, the second device 420 may configure its own antenna for a directional reception (e.g., primary antenna radiation lobe) selectively aimed at the first device 410. Therefore, while the antenna of the first device 410 is configured for the directional transmission toward the second device 420 and the antenna of the second device 420 is configured for the directional reception from the first device 410, the first device 410 transmits one or more data frames to the second device 420. Accordingly, the first and second devices 410 and 420 perform directional transmission/reception (DIR-TX/RX) of the one or more data frames through the primary lobe (main beam).

On the other hand, the first and second devices 410 and 420 may partially modify the beam pattern of the third device 430 to reduce interference with the third device 430 due to an antenna radiation pattern with the non-primary lobes.

In this regard, the third device 430 determines that it is not an intended receiving device of the CTS-TRN frame 350 on the basis of an address indicated in the receiver address field 364 of the CTS-TRN frame 350. In response to the determination that it is not the intended receiving device of the CTS-TRN frame 350, the third device 430 uses the beam training sequence of the beam training sequence field 368 of the received CTS-TRN 350 and the sequence of the beam training sequence field 320 of the previously-received RTS-TRN frame 300, in order to configure its antenna to generate antenna radiation patterns each with nulls substantially aimed at the second device 420 and the first device 410. The nulls may be based on estimated arrival angles of the previously-received TRS-TRN frame 300 and CTS-TRN frame 350. In general, the third device 430 generates antenna radiation patterns with desired signal power, refusals, or gains aimed at the first device 410 and the second device 420 such that estimated interferences at the devices 410 and 420 are equal to or lower than a defined threshold value (e.g., to achieve a desired bit error rate (BER), signal-to-noise ratio (SNR), signal-to-interference ratio (SINR), and/or other one or more communication attributes).

The third device 430 may configure its antenna transmission radiation pattern by estimating antenna gains in directions toward the first and second devices 410 and 420, estimating antenna mutuality differences (e.g., transmitting antenna gain-receiving antenna gain) between the third device 430 and the first and second devices 410 and 420, and calculating those values over one or more sectors for determining corresponding estimated interferences at the first and second devices 410 and 420.

The third device 430 transmits the RTS-TRN frame 300 intended for the fourth device 440, which the fourth device 440 receives. The third device 430 maintains an antenna configuration with nulls aimed at the first and second devices 410 and 420 as long as the first device 410 and the second device 420 are communicating based on durations displayed on the duration fields 312 and 362 of the RTS-TRN frame 300 and the CTS-TRN frame 350, respectively. As the antenna of the third device 430 is configured to produce the nulls aimed at the first device 410 and the second device 420, the transmission of the RTS-TRN frame 300 by the third device 430 may produce reduced interferences at the first device 410 and the second device 420.

Therefore, electronic devices supporting the 802.11ay wireless interface disclosed herein can form a signal-null to a specific direction for interference reduction while matching a main beam direction therebetween using array antennas. To this end, the plurality of electronic devices may form an initial beam direction through a beam training sequence, and change the beam direction through the periodically updated beam training sequence.

As aforementioned, the beam directions should be matched between the electronic devices for high-speed data communication between the electronic devices. Also, the loss of wireless signals transmitted to an antenna element should be minimized for the high-speed data communication. To this end, the array antenna should be disposed inside a multi-layered substrate on which a radio frequency integrated circuit (RFIC) is disposed. Also, the array antenna is necessarily disposed adjacent to a side area inside the multi-layered substrate for radiation efficiency.

In addition, the beam training sequence should be updated to adapt to the change of a wireless environment. To update the beam training sequence, the RFIC should periodically transmit and receive signals to and from a processor such as a modem. Therefore, control signal transmission and reception between the RFIC and the modem should also be carried out within fast time to minimize an update delay time. To this end, a physical length of a connection path between the RFIC and the modem should be reduced. To this end, the modem may be disposed on the multi-layered substrate on which the array antenna and the RFIC are disposed. Or, in the structure that the array antenna and the RFIC are disposed on the multi-layered substrate and the modem is disposed on a main substrate, the connection length between the RFIC and the modem may be minimized. A detailed structure thereof will be described later with reference to FIG. 5C.

Figure 4:
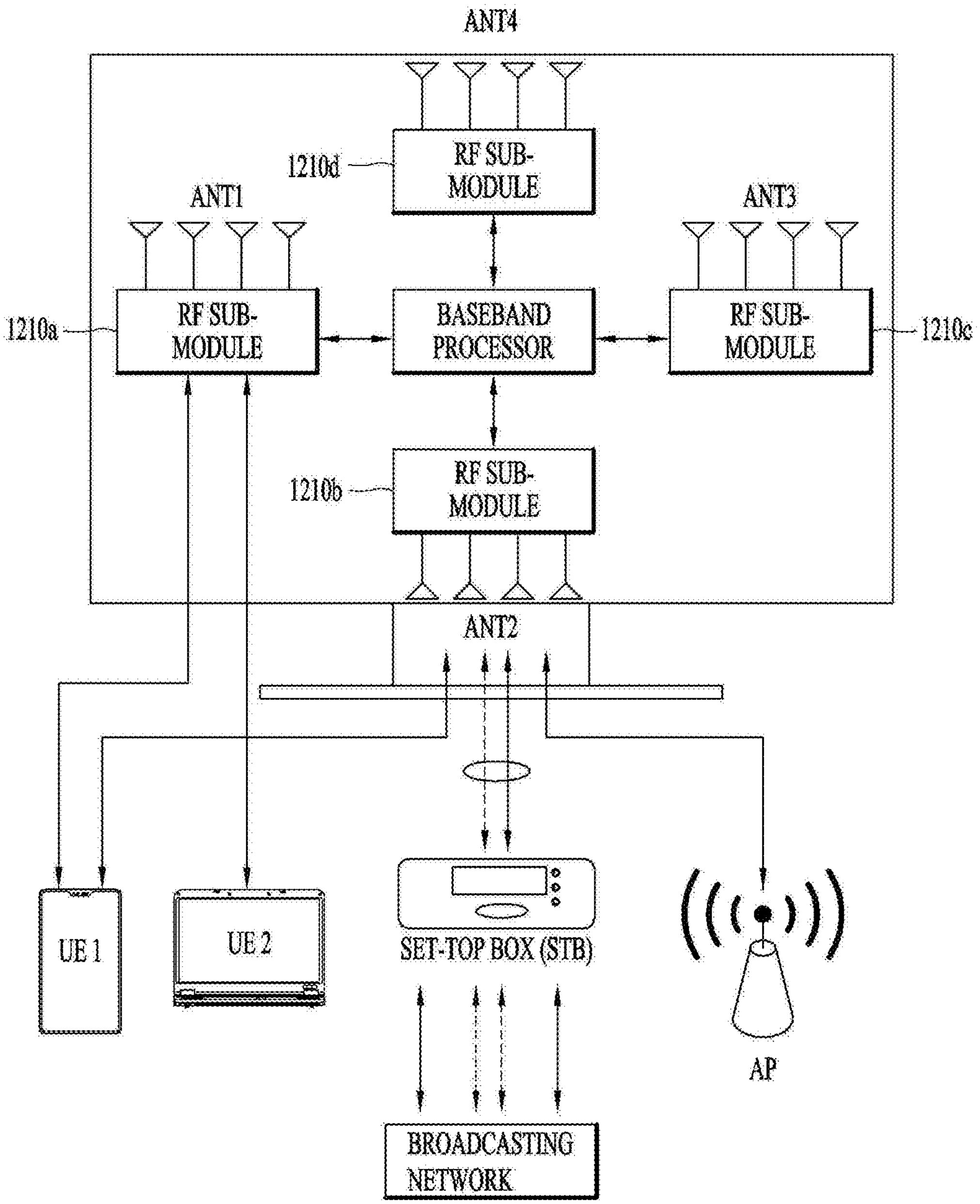
FIG. 4 is a view of an electronic device including a plurality of antenna modules and a plurality of transceiver circuit modules in accordance with an embodiment.

Hereinafter, an electronic device having an array antenna that can operate in an mmWave band will be described. In this regard, FIG. 4 is a diagram illustrating an electronic device including a plurality of antenna modules and a plurality of transceiver circuit modules in accordance with one embodiment. Referring to FIG. 4, a home appliance in which a plurality of antenna modules and a plurality of transceiver circuit modules are disposed may be a television, but is not limited thereto. Therefore, the home appliance having the plurality of antenna modules and the plurality of transceiver circuit modules disclosed herein may include an arbitrary home appliance or display device that supports a communication service in a millimeter wave band.

Referring to FIG. 4, the electronic device 1000 includes a plurality of antenna modules ANT1 to ANT4 and a plurality of transceiver circuit modules 1210*a* to 1210*d*. In this regard, the plurality of transceiver circuit modules 1210*a* to 1210*d* may correspond to the aforementioned transceiver circuit 1250. Or, the plurality of transceiver circuit modules 1210*a* to 1210*d* may be a partial configuration of a transceiver circuit 1250 or a partial configuration of a front end module disposed between the antenna module and the transceiver circuit 1250.

The plurality of antenna modules ANT1 to ANT4 may be configured as array antennas with a plurality of antenna elements. The number of elements of each antenna module ANT1 to ANT4 may be two, three, four, and the like as aforementioned, but it not limited thereto. For example, the number of antenna modules ANT1 to ANT4 may be expanded to two, four, eight, sixteen, and the like. Also, the elements of the antenna modules ANT1 to ANT4 may be selected by the same number or different numbers. The plurality of antenna modules ANT1 to ANT4 may be disposed on different areas of the display or on a bottom or side surface of the electronic device. The plurality of antenna modules ANT1 to ANT4 may be disposed on top, left, bottom, and right sides of the display, but the present disclosure is not limited thereto. As another example, the plurality of antenna modules ANT1 to ANT4 may alternatively be disposed on a left top portion, a right top portion, a left bottom portion, and a right bottom portion of the display.

The antenna modules ANT1 to ANT4 may be configured to transmit and receive signals at an arbitrary frequency band in a specific direction. For example, the antenna modules ANT1 to ANT4 may operate at one of 20 GHz band, 39 GHz band, and 64 GHz band.

The electronic device may maintain a connection state with different entities through two or more of the antenna modules ANT1 to ANT4 or perform data transmission or reception therefor. In this regard, the electronic device corresponding to the display device may transmit or receive data to or from a first entity through the first antenna module ANT1. The electronic device may transmit or receive data to or from a second entity through the second antenna module ANT2. As one example, the electronic device may transmit or receive data to or from a mobile terminal (User Equipment (UE)) through the first antenna module ANT1. The electronic device may transmit or receive data to or from a control device such as a set-top box or access point (AP) through the second antenna module ANT2.

The electronic device may transmit or receive data to or from other entities through the other antenna modules, for example, the third antenna module ANT3 and the fourth antenna module ANT4. As another example, the electronic device may perform dual connectivity or MIMO with at least one of previously-connected first and second entities through the third antenna module ANT3 and the fourth antenna module ANT4.

The mobile terminals UE1 and UE2 may be disposed on a front area of the electronic device to communicate with the first antenna module ANT1. On the other hand, the set-top box STB or the AP may be disposed on a bottom area of the electronic device to communicate with the second antenna module ANT2 but is not limited thereto. As another example, the second antenna module ANT2 may include a first antenna radiating a signal to the bottom area, and a second antenna radiating a signal to a front area. Therefore, the second antenna module ANT2 may perform communication with the set-top box STB or the AP through the first antenna, and perform communication with one of the mobile terminals UE1 and UE2 through the second antenna.

Meanwhile, one of the mobile terminals UE1 and UE2 may be configured to perform MIMO with the electronic device. As one example, the UE1 may be configured to perform MIMO while performing beamforming with the electronic device. As aforementioned, the electronic device corresponding to the image display device may perform high-speed communication with another electronic device or set-top box through a WiFi wireless interface. As one example, the electronic device may perform high-speed communication with another electronic device or set-top box at 60 GHz through 802.11ay wireless interface.

In the meantime, the transceiver circuit modules 1210*a* to 1210*d* may operate to process transmission signals and reception signals at RF frequency bands. Here, the RF frequency bands, as aforementioned, may be arbitrary mmWave frequency bands, such as 28 GHz, 39 GHz, and 64 GHz. The transceiver circuit modules 1210*a* to 1210*d* may be referred to as RF sub-modules 1210*a* to 1210*d*. At this time, the number of RF sub-modules 1210*a* to 1210*d* may not be limited to four, but may vary to an arbitrary number more than two depending on an application.

Also, the RF sub-modules 1210*a* to 1210*d* may include an up-conversion module and a down-conversion module that convert a signal of an RF frequency band into a signal of an IF frequency band or a signal of an IF frequency band into a signal of an RF frequency band. To this end, the up-conversion module and the down-conversion module may include a local oscillator (LO) that can perform up-frequency conversion and down-frequency conversion.

The plurality of RF sub-modules 1210*a* to 1210*d* may be configured such that a signal is transmitted from one of the plurality of transceiver circuit modules to an adjacent transceiver circuit module. Accordingly, the transmitted signal may be transmitted at least one time to all of the plurality of transceiver circuit modules 1210*a* to 1210*d*.

To this end, a data transfer path in a loop structure may be additionally provided. In this regard, the adjacent RF sub-modules 1210*b* and 1210*c* may be allowed to perform a bi-directional signal transfer through a transfer path P2 with the loop structure.

Or, a data transfer path in a feedback structure may be additionally provided. In this regard, at least one RF sub-module 1210*c* may be allowed to perform a uni-directional signal transfer to the other RF sub-modules 1210*a*, 1210*b*, and 1210*c* through the data transfer path with the feedback structure.

The plurality of RF sub-modules may include a first RF sub-module to a fourth RF sub-module 1210*a* to 1210*d*. In this regard, a signal may be transferred from the first RF sub-module 1210*a* to the adjacent second RF sub-module 1210B and fourth RF sub-module 1210*d*. Also, the second RF sub-module 1210*b* and the fourth RF sub-module 1210*d* may transfer the signal to the third RF sub-module 1210*c*. At this time, when the second RF sub-module 1210*b* and the third RF sub-module 1210*c* are available to transmit signals bidirectionally, it may be referred to as the loop structure. On the other hand, when the second RF sub-module 1210*b* and the third RF sub-module 1210*c* are available to merely transmit signals unidirectionally, it may be referred to as the feedback structure. In the feedback structure, at least two signals may be transferred to the third RF sub-module 1210*c*.

However, with no limit to this, the baseband module may be disposed in a specific module of the first to fourth RF sub-modules 1210*a* to 1210*d* depending on applications. Or, depending on applications, the baseband module may not be disposed in the first to fourth RF sub-modules 1210*a* to 1210*d*, but may be configured as a separate controller, namely, a baseband processor 1400. For example, a control signal transfer may alternatively be carried out only by the separate controller, namely, the baseband processor 1400.

Hereinafter, a description will be given of detailed configuration and functions of the electronic device, as illustrated in FIG. 1, having wireless interfaces as illustrated in FIG. 2. Electronic devices need to perform data transmission and reception between the electronic devices using communication services in an mmWave band. In this regard, wireless audio-video (AV) service and/or high-speed data transmission may be provided by using 802.11ay wireless interface as the mmWave wireless interface. In this case, the mmWave wireless interface is not limited to the 802.11ay wireless interface, but an arbitrary wireless interface of 60 GHz may be applied. In this regard, a 5G or 6G wireless interface that uses 28 GHz band or 60 GHz band may alternatively be used for high-speed data transmission between electronic devices.

There is no detailed solution to antenna and radio frequency integrated chip (RFIC) providing a wireless interface in an electronic device, such as an image display device, for transferring images with resolution of at least 4K. Specifically, considering a situation that the electronic device, such as the image display device, is disposed on a wall of a building or a table, the electronic device need to transmit or receive wireless AV data to or from another electronic device. To this end, a detailed configuration and antenna structure for determining an area of the image display device to dispose the antenna and RFIC should be proposed.

Figure 5A:
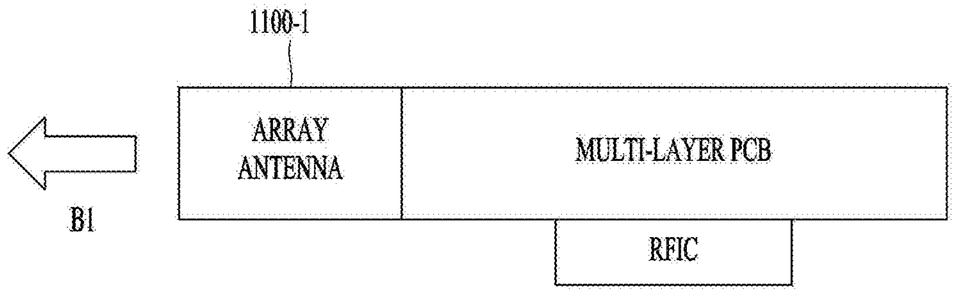
FIG. 5A is a view of a configuration, in which a multi-layered circuit board having an array antenna module is connected to a radio frequency integrated circuit (RFIC), in relation to the disclosure.
Figure 5A:
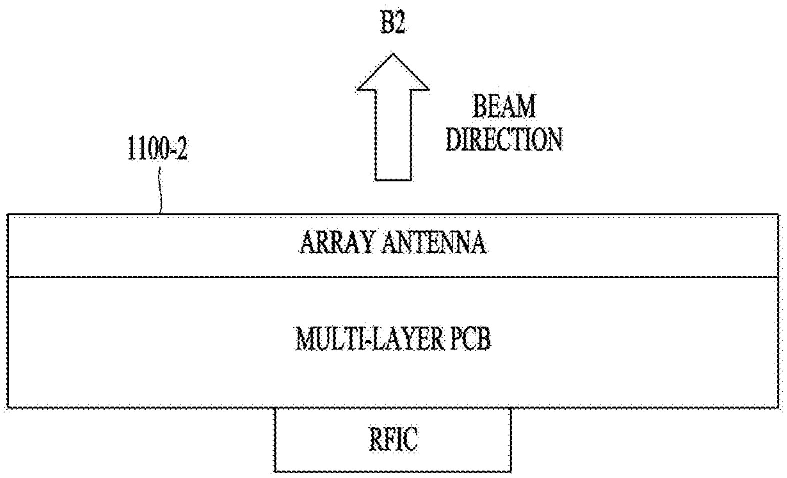

In this regard, FIG. 5A is a view of a configuration, in which a multi-layered circuit board having an array antenna module is connected to an RFIC, in relation to the disclosure. In some embodiments, FIG. 5A is a view of an antenna in package (AIP) module structure and an antenna module structure implemented on a flexible substrate, in relation to the disclosure.

Referring to (a) of FIG. 5A, the AIP module may be disposed for mmWave band communication, and may be configured in an integral form of RFIC-PCB-antenna. In this regard, an array antenna module 1100-1, as illustrated in (a) of FIG. 5, may be formed integrally with a multi-layered PCB. Therefore, the array antenna module 1100-1 integrally formed with the multi-layered PCB may be referred to as the AIP module. For example, the array antenna module 1100-1 may be arranged on one side area of the multi-layered PCB. Accordingly, a first beam B1 may be formed toward the side area of the multi-layered PCB by using the array antenna module 1100-1 disposed on the one side area of the multi-layered PCB.

In some embodiments, referring to (b) of FIG. 5A, an array antenna module 1100-2 may be arranged on top of the multi-layered PCB. The arrangement of the array antenna module 1100-2 is not limited to the structure of (b) of FIG. 5A, but may be arranged on an arbitrary layer inside the multi-layered PCB. Accordingly, a second beam B2 may be formed toward a front area of the multi-layered PCB by using the array antenna module 1100-2 arranged on the arbitrary layer of the multi-layered PCB. The AIP module integrally formed with the array antenna module may be configured such that an array antenna is arranged on the same PCB to minimize a distance between the RFIC and the antenna.

For example, the antenna of the AIP module may be produced through a multi-layered PCBA manufacturing process, and may radiate a signal in a vertical/lateral direction of the PCB. In this regard, dual polarization may be realized by using a patch antenna, a dipole/monopole antenna, or the like. Therefore, the first array antenna 1100-1 of (a) of FIG. 5A may be arranged on the side area of the multi-layered PCB and the second array antenna 1100-2 of (b) of FIG. 5A may be arranged on the side area of the multi-layered PCB. Accordingly, the first beam B1 may be generated through the first array antenna 1100-1 and the second beam B2 may be generated through the second array antenna 1100-2.

The first array antenna 1100-1 and the second array antenna 1100-2 may be configured to be in the same polarization. Or, the first array antenna 1100-1 and the second array antenna 1100-2 may be configured to be in orthogonal polarizations to each other. In this regard, the first array antenna 1100-1 may operate as a vertically polarized antenna and the second array antenna 1100-2 may operate as a horizontally polarized antenna. As one example, the first array antenna 1100-1 may be a monopole antenna having the vertical polarization and the second array antenna may be a patch antenna having the horizontal polarization.

Figure 5B:
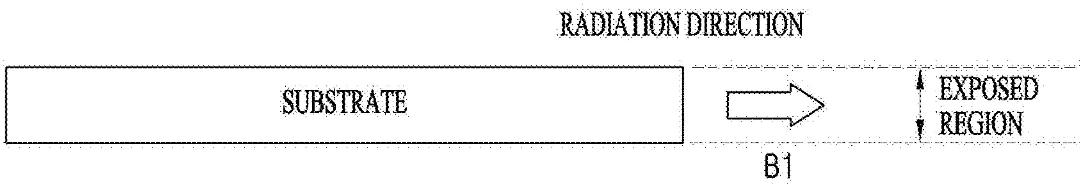
FIG. 5B is a conceptual view of antenna structures having different radiation directions.
Figure 5B:
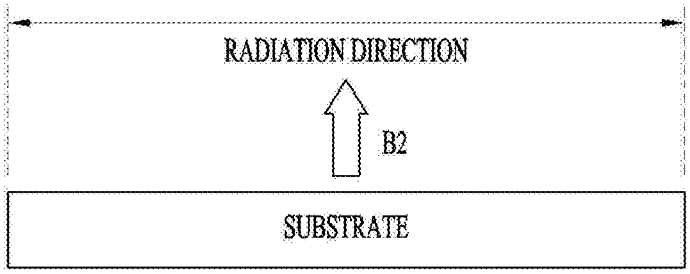

In some embodiments, FIG. 5B is a conceptual view of antenna structures having different radiation directions.

Referring to (a) of FIG. 5A and (a) of FIG. 5B, a radiation direction of an antenna module arranged on the side area of the multi-layered PCB may correspond to a lateral (side) direction. In relation, an antenna implemented on a flexible substrate may be configured as radiation elements such as dipole/monopole antennas. That is, the antennas implemented on the flexible substrate may include end-fire antenna elements.

End-fire radiation may be implemented by an antenna that radiates a signal in a horizontal direction with respect to a substrate. The end-fire antenna may be implemented as a dipole/monopole antenna, a Yagi dipole antenna, a Vivaldi antenna, a SIW horn antenna, or the like. Here, the Yagi-dipole antenna and the Vivaldi antenna may have horizontal polarization characteristics. In some embodiments, one of antenna modules arranged on the image display device disclosed herein may require for a vertically polarized antenna. Therefore, there is a need of proposing an antenna structure capable of minimizing an exposed portion of an antenna while operating as a vertically polarized antenna.

Referring to (b) of FIG. 5A and (a) of FIG. 5B, a radiation direction of an antenna module arranged on the front area of the multi-layered PCB may correspond to a front direction. In relation, antennas arranged on the AIP module may be configured as radiation elements such as patch antennas. That is, the antennas arranged on the AIP module may include broadside antenna elements that radiate in a broadside direction.

Figure 5C:
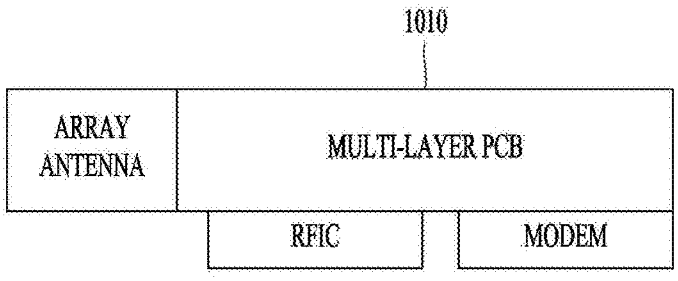
FIG. 5C is a view of coupling structures between a multi-layered substrate and a main substrate according to embodiments.
Figure 5C:
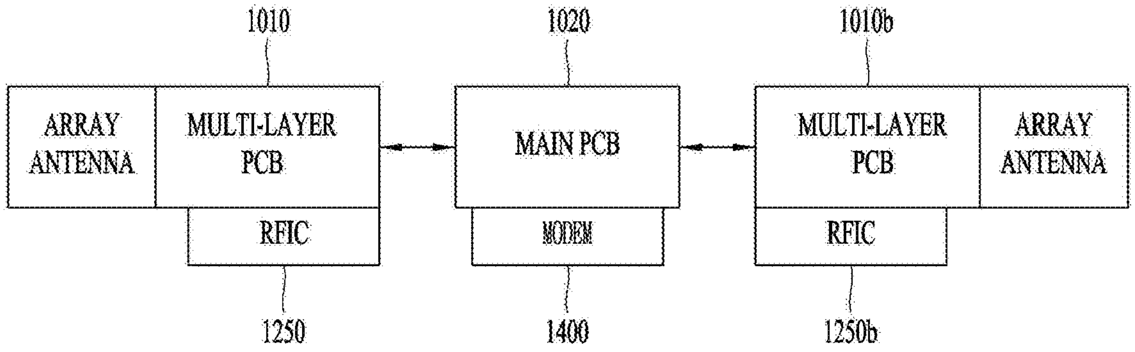

In some embodiments, a multi-layered PCB in which an array antenna is arranged may be integrally formed with a main substrate or may be modularly coupled to the main substrate by a connector. In this regard, FIG. 5C is a view of coupling structures between a multi-layered substrate and a main substrate in accordance with embodiments. Referring to (a) of FIG. 5C, a structure in which an RFIC 1250 and a modem 1400 are integrally formed on the multi-layered PCB 1010 is illustrated. The modem 1400 may be referred to as a baseband processor 1400. Therefore, the multi-layered PCB 1010 may be integrally formed with the main substrate. The integral structure may be applied to a structure in which only one array antenna module is arranged in an electronic device.

In some examples, the multi-layered PCB 1010 and the main substrate 1020 may be modularly coupled to each other by a connector. Referring to (b) of FIG. 5C, the multi-layered PCB 1010 may be interfaced with the main substrate 1020 through the connector. In this instance, the RFIC 1250 may be arranged on the multi-layered PCB 1010 and the modem 1400 may be disposed on the main substrate 1020.

Accordingly, the multi-layered PCB 1010 may be produced as a separate substrate from the main substrate 1020 and coupled to the main substrate 1020 through the connector.

The modular structure may be applied to a structure in which a plurality of array antenna modules are arranged in an electronic device. Referring to (b) of FIG. 5C, the multi-layered PCB 1010 and a second multi-layered PCB 1010*b* may be interfaced with the main substrate 1020 through connectors. The modem 1400 arranged on the main substrate 1020 may be electrically coupled to RFICs 1250 and 1250*b*, which are arranged on the multi-layered PCB 1010 and the second multi-layered PCB 1010*b*.

Figure 6:
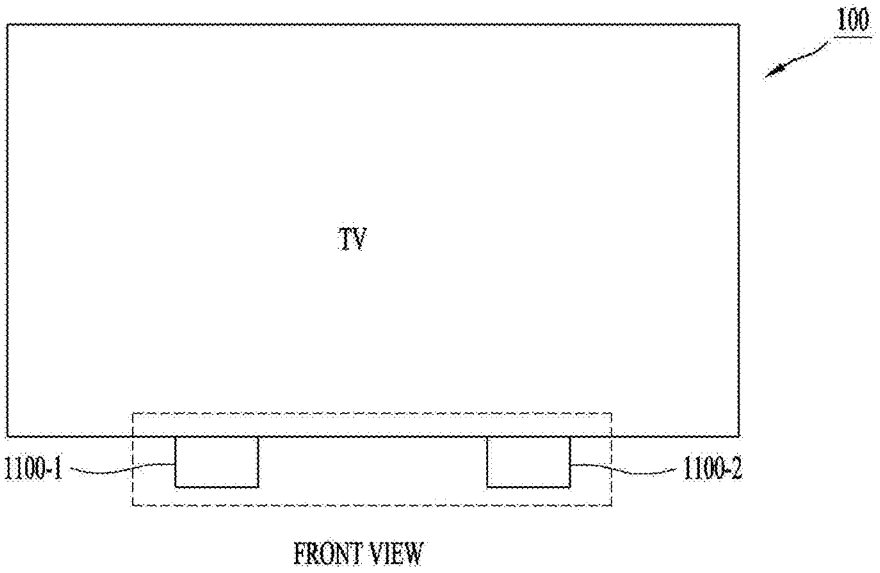
FIG. 6 is a conceptual view of a plurality of communication modules arranged on a lower portion of an image display device, and communication performed between components of a corresponding communication module and another communication module arranged in a front direction.
Figure 6:
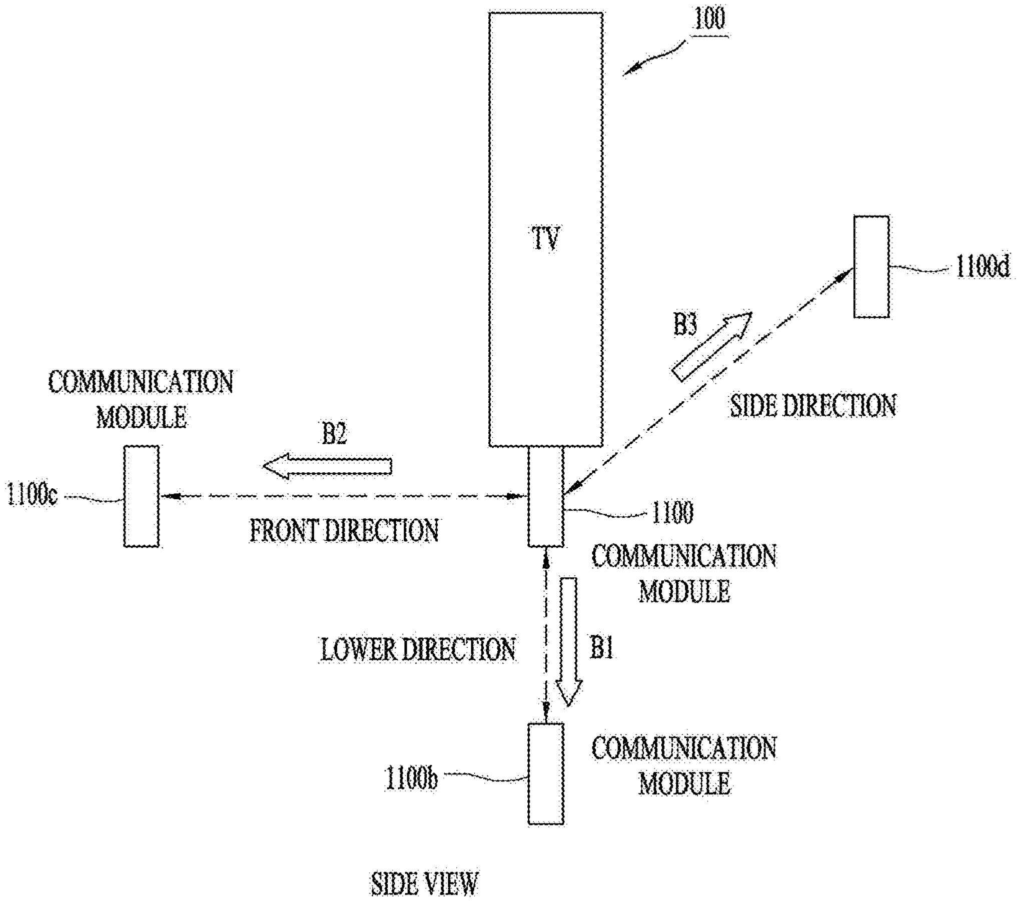

In some embodiments, when the AIP module is arranged beneath the electronic device such as the image display device, it is necessary to communicate with other communication modules arranged in a lower direction and a front direction. In this regard, FIG. 6 is a conceptual view of a plurality of communication modules arranged on a lower portion of an image display device, and communication performed between components of a corresponding communication module and another communication module arranged in a front direction. Referring to (a) of FIG. 6, different communication modules 1100-1 and 1100-2 may be arranged on the lower portion of the image display device 100. Referring to (b) of FIG. 6, the image display device 100 may perform communication with a communication module 1100*b* arranged below the image display device 100 through an antenna module 1100. The image display device 100 may perform communication with a second communication module 1100*c* arranged at the front of the image display device 100 through the antenna module 1100. The image display device 100 may also perform communication with a third communication module 1100*d* arranged at a lateral side of the image display device 100 through the antenna module 1100.

Here, the communication module 1100*b* may be a set-top box or AP that transfers AV data to the image display device 100 at high speed through the 802.11ay wireless interface, but is not limited thereto. Also, the second communication module 1100*c* may be an arbitrary electronic device that transmits and receives data at high speed to and from the image display device 100 through the 802.11ay wireless interface. In some embodiments, to perform wireless communication with communication modules 1100*b*, 1100*c*, and 1100*d* arranged on the front, lower, and lateral sides, the antenna module 1100 having a plurality of array antennas may form beams in different directions. In some embodiments, the antenna module 1100 may form beams in a front direction B1, a lower direction B2, and a side direction B3 through different array antennas.

An antenna height may increase according to an RFIC drive circuit and a heat dissipation structure in the AIP module structure as illustrated in (a) of FIG. 5A. Also, the antenna height may increase in the AIP module structure as illustrated in (a) of FIG. 5A according to an antenna type used. For example, the antenna module structure implemented on the side area of the multi-layered substrate as illustrated in (b) of FIG. 5A may be implemented as a low-profile type.

Hereinafter, a description will be given of detailed configurations of the antenna modules of FIGS. 5A to 5C to be arranged inside or on a side surface of the electronic device of FIGS. 4 and 6, in the electronic device as illustrated in FIGS. 1 and 2.

The electronic device, such as the image display device, may include a communication module having antennas to perform communications with neighboring electronic devices. In some embodiments, as a display area (region) of the image display device is expanded recently, an arrangement space of a communication module including antennas may be reduced. This may cause an increase in necessity of arranging antennas inside a multi-layered printed circuit board (PCT) on which the communication module is implemented.

In some embodiments, a WiFi wireless interface may be considered as an interface for a communication service between electronic devices. When using such a WiFi wireless interface, a millimeter wave (mmWave) band may be used for high-speed data transmission between the electronic devices. In particular, the high-speed data transmission between the electronic devices may be achieved using a wireless interface, such as 802.11ay.

In relation to this, an array antenna capable of operating in a mmWave band may be mounted in the antenna module. However, electronic components such as an antenna and a transceiver circuit arranged in the antenna module are configured to be electrically connected to each other. To do so, the transceiver circuit may be operably coupled to the antenna module, and the antenna module may be configured as a multi-layer substrate.

In the antenna module having a form of the multi-layer substrate, when an antenna element is implemented as a single layer, a bandwidth of the antenna element may be limited. Meanwhile, when a plurality of antenna elements are stacked on different layers, a change in coupling between the antenna elements may react sensitively to a change in a frequency.

The present disclosure is directed to solving the aforementioned problems and other drawbacks. Another aspect of the present disclosure is to provide a broadband antenna module operating in a mmWave band, and an electronic device including the broadband antenna module.

Another aspect of the present disclosure is to enhance an antenna gain by enhancing efficiency of an antenna element operating in a mmWave band.

Another aspect of the present disclosure is to reduce a level of mutual interference when implementing a dual polarization antenna by reducing undesired directional current components of an antenna element operating in a mmWave band.

Another aspect of this disclosure is to optimize antenna performance when an RFIC and an antenna element are connected to each other via feeding lines in a PCB having a form of a multi-layer substrate.

Figure 7:
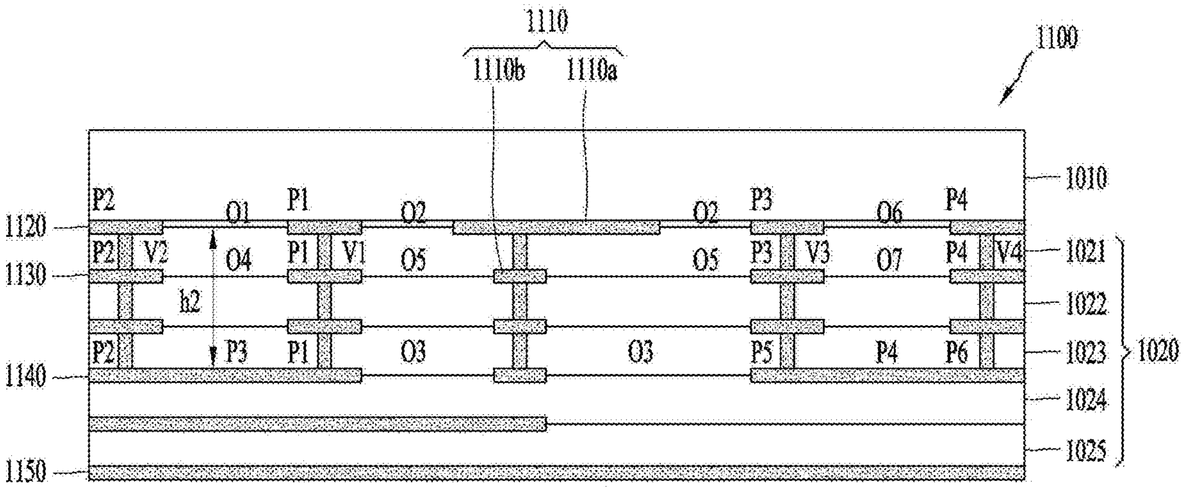
FIG. 7 is a side view of an antenna module operating in a mmWave band according to the disclosure.
Figure 8:
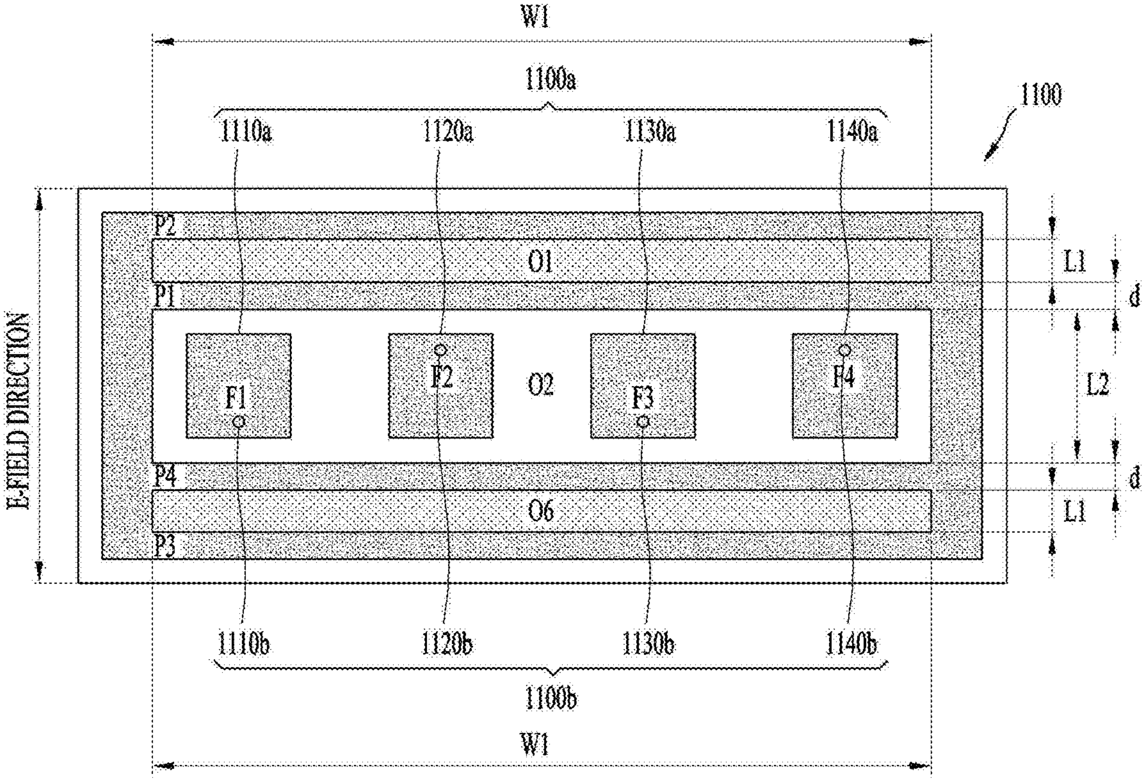
FIG. 8 is a front view of the antenna module of FIG. 7.
Figure 9:
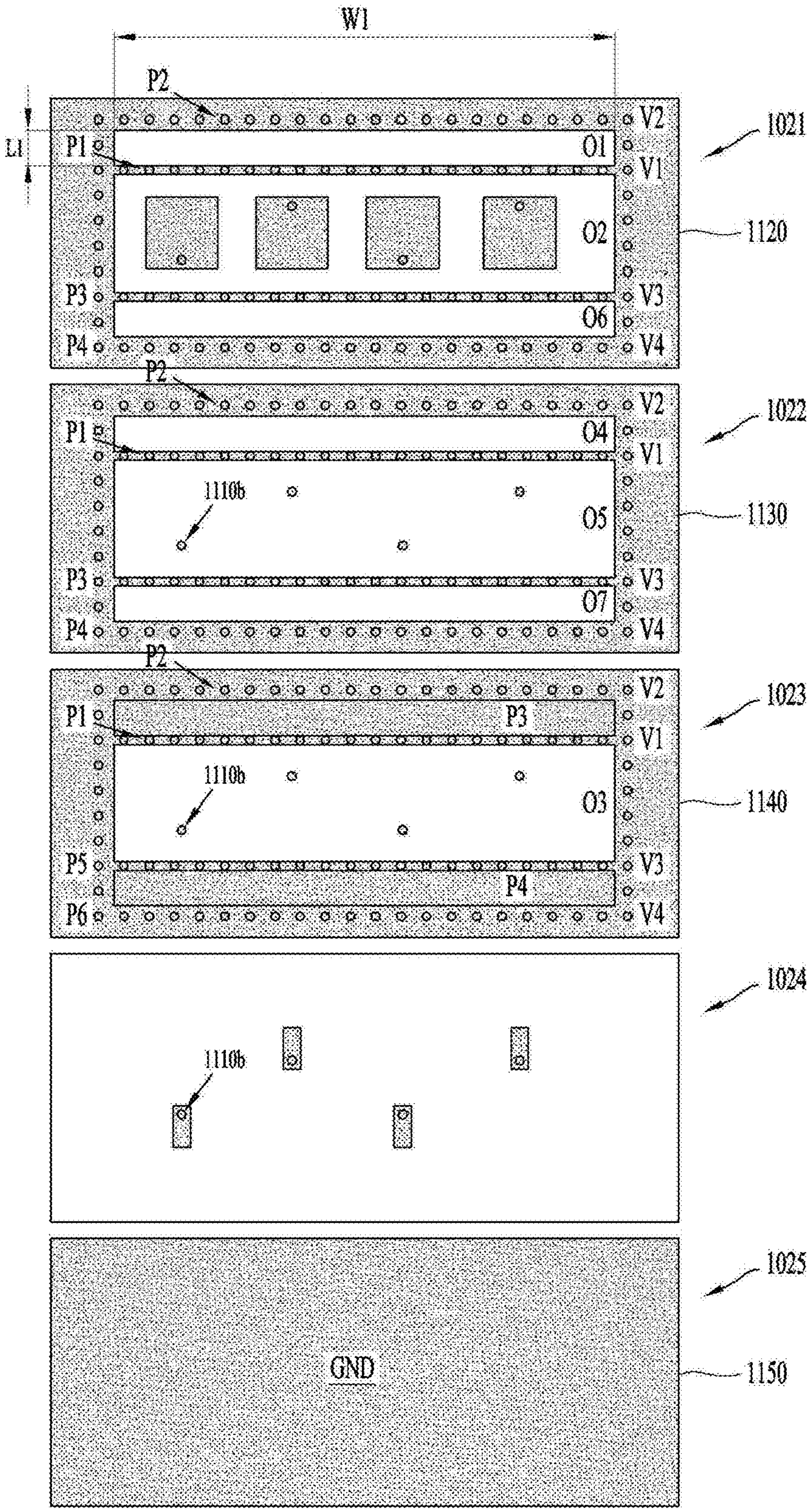
FIG. 9 illustrates a configuration of each layer in a dielectric substrate of the antenna module of FIG. 7.

Hereinafter, an antenna module operating in a mmWave band according to this disclosure, and an electronic device including the antenna module are described. In relation to this, FIG. 7 is a side view of an antenna module operating in a mmWave band according to the disclosure. Meanwhile, FIG. 8 is a front view of the antenna module of FIG. 7. FIG. 9 illustrates a configuration of each layer in a dielectric substrate of the antenna module of FIG. 7.

Referring to FIGS. 7 to 9, the electronic device may be configured to include an antenna module. The antenna module may be configured to include a dielectric cover layer 1010, a dielectric substrate 1020, and a phased array antenna 1100.

The dielectric substrate 1020 of the antenna module may include a plurality of conductive layers. Each of the plurality of conductive layers constitutes a separate layer. In relation to this, the dielectric substrate 1020 may be configured to include a first layer 1021 and a second layer 1022. The first layer 1021 and the second layer 1022 may have opening regions disposed above and below openings arranged to surround the antenna element, respectively. The dielectric substrate 1020 may be configured to further include a third layer 1023, a fourth layer 1024, and a fifth layer 1025. The third layer 1023, the fourth layer 1024, and the fifth layer 1025 may have openings disposed only in regions in which the antenna element is placed, but are not limited thereto.

The first layer 1021 may be configured to have a first conductive layer 1120 including a first opening O1 and a second opening O2 on a surface of the dielectric substrate 1020. A first part P1 of the first conductive layer 1120 may be disposed between the first opening O1 and the second opening O2. A second part P2 of the first conductive layer 1120 may be disposed to face the first part P1 of the first conductive layer 1120 in a vicinity of the first opening O1.

The second layer 1022 may be configured to have a second conductive layer 1130 including a fourth opening O4 and a fifth opening O5 in the dielectric substrate 1020. A first part P1 of the second conductive layer 1130 may be disposed between the fourth opening O4 and the fifth opening O5. A second part P2 of the second conductive layer 1130 may be disposed to face the first part P1 of the second conductive layer 1130 in a vicinity of the fourth opening O4.

The third layer 1023 may be configured to have a third conductive layer 1140 including a third opening O3 in the dielectric substrate 1020. The fourth layer 1024 may be configured to have a plurality of conductive traces. The fourth layer 1024 may include the plurality of conductive traces defining transmission line paths. The fifth layer 1025 may be configured to have a fourth conductive layer 1150 configured to operate as ground.

A U-shaped wall may be disposed on one side of the antenna element 1110 by a plurality of conductive layers 1120, 1130, and 1140 constituted by a plurality of layers and conductive vias V1 and V2 configured to connect the conductive layers 1120, 1130, and 1140. In addition, a U-shaped wall may be disposed on one side of the antenna element 1110 by the plurality of conductive layers 1120, 1130, and 1140 constituted by a plurality of layers and conductive vias V3 and V4 configured to connect the conductive layers 1120, 1130, and 1140. The antenna element 1110 may be configured to include a patch element 1110*a* and transmission line paths 1110*b*.

The dielectric cover layer 1010 may be placed in a region on the dielectric substrate 1020. The dielectric cover layer 1010 may be configured as a dielectric structure of the electronic device, and may function as a cover or a radome to prevent a phased array antenna 1100 from being exposed to outside. The dielectric substrate 1020 may be configured to have a surface mounted to face the dielectric cover layer.

The phased array antenna 1100 may be disposed on the dielectric substrate 1020. The phased array antenna 1100 may include a plurality of patch elements 1100*a* and transmission line paths 1100*b* on a surface of the dielectric substrate 1020. The patch elements 1100*a* may include first to fourth patch elements 1110*a* to 1140*a*. The transmission line paths 1100*b* may also include first to fourth transmission line paths 1110*b* to 1140*b*. First to fourth feed portions F1 to F4 may be disposed at points where the first to fourth transmission line paths 1110*b* to 1140*b* are connected to the first to fourth patch elements 1110*a* to 1140*a*. Positions of the first to fourth feed portions F1 to F4 may be arranged to be symmetrical to a center line to reduce interference between the first to fourth patch elements 1110*a* to 1140*a*.

In this regard, a number of the plurality of patch elements is not limited to four, and may be modified to two, four, six, eight, ten, twelve, or sixteen depending on an application. The phased array antenna 1100 may be configured to transmit radio-frequency signals at a frequency between 10 GHz and 300 GHz through the dielectric cover layer 1010. The phased array antenna 1100 may be configured to perform beam forming to change a direction of a beam by controlling a phase of a signal applied to the plurality of patch elements 1100*a*.

The patch elements 1100*a* may be placed in the second opening O2 in the first conductive layer 1120. The transmission line paths 1100*b* may be placed in the fifth opening O5 in the second layer 1022 and the third opening O3 in the third layer 1020. The first part P1 of the first conductive layer 1120, the first part P1 of the second conductive layer 1130, and a first part P1 of the third conductive layer 1140 may be connected to each other by first conductive vias V1. The second part P2 of the first conductive layer 1120, the second part P2 of the second conductive layer 1130, and a second part P2 of the third conductive layer 1140 may be connected to each other by second conductive vias V2. The first parts P1 and the second parts P2 of the first conductive layer 1120, the second conductive layer 1130, the third conductive layer 1140 may be disposed to correspond to each other in each layer. The third conductive layer 1140 may have a third part P3 between the first part P1 and the second part P2, the third part P3 being a metal region instead of an opening region.

The third part P3 of the third conductive layer 1140 may be disposed to overlap the first opening O1 and the fourth opening O4. The first conductive vias V1 and the second conductive vias V2 may be configured to be electrically connected to the third part P3 of the third conductive layer 1140. The first conductive vias V1 and the second conductive vias V2 may be configured to be electrically connected to the third part P3 of the third conductive layer 1140.

The second layer 1022 may be configured to include a plurality of layers in the dielectric substrate 1020. A length L2 of a long side of the second opening O2 may be configured to be equal to or greater than a length L1 of a long side of the first opening O1. In this regard, a length W1 of the long side of the first opening O1 may be configured to be equal to greater than $\lambda_0$. A length L1 of a short side of the first opening O1 may be configured to be equal to or greater than $0.13\lambda_0$.

An interval distance h1 from a surface of the first layer 1021 to a surface of the third layer 1023 may be configured to be equal to or greater than $0.02\lambda_0$. An interval distance d from an edge of the first opening O1 to an edge of the second opening O2 may be configured to be equal to or greater than $0.13\lambda_0$.

Figure 10:
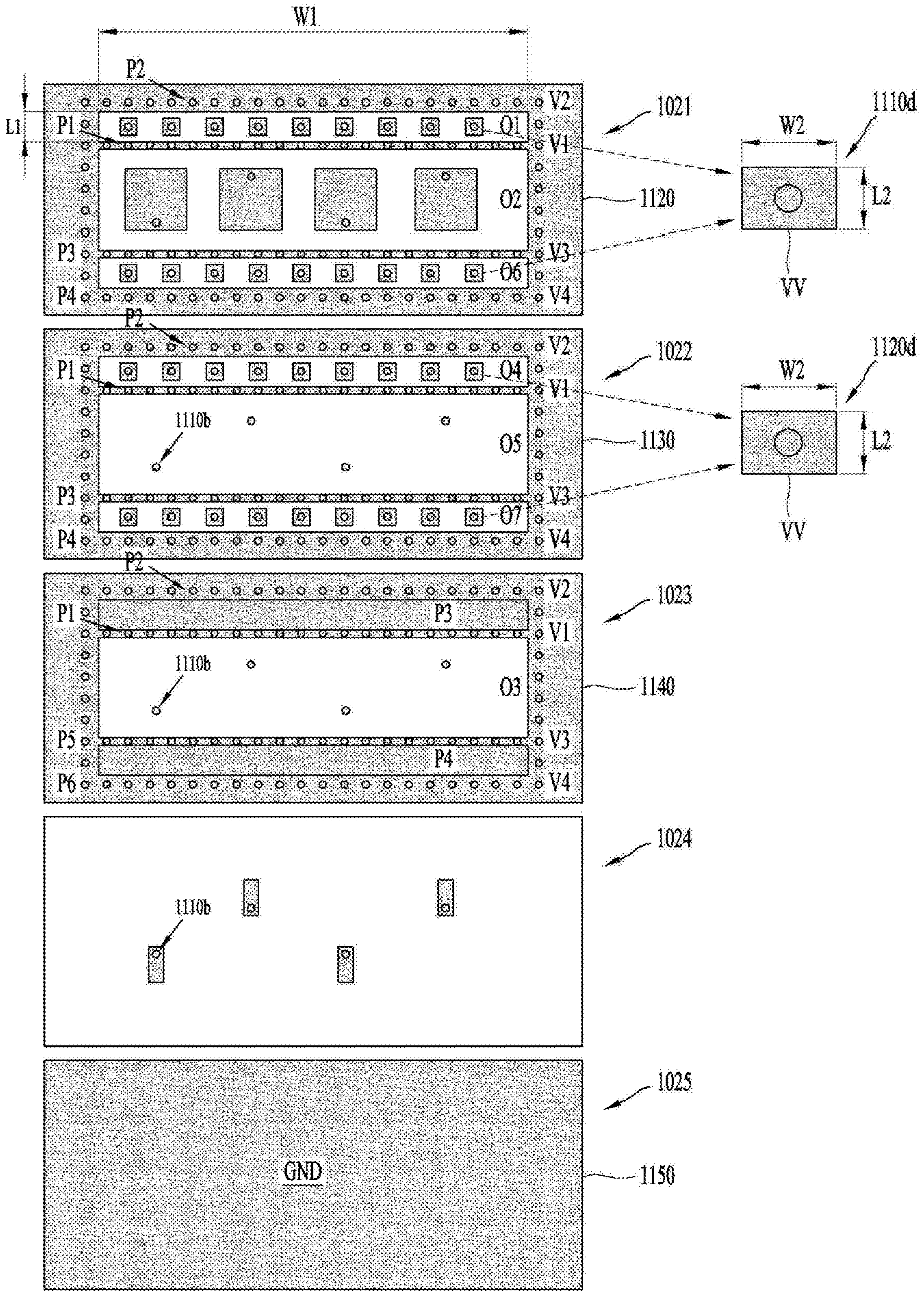
FIG. 10 illustrates a structure in which a dummy pattern is arranged in an opening region of a multilayer substrate constituting the antenna module of FIG. 9.
Figure 11:
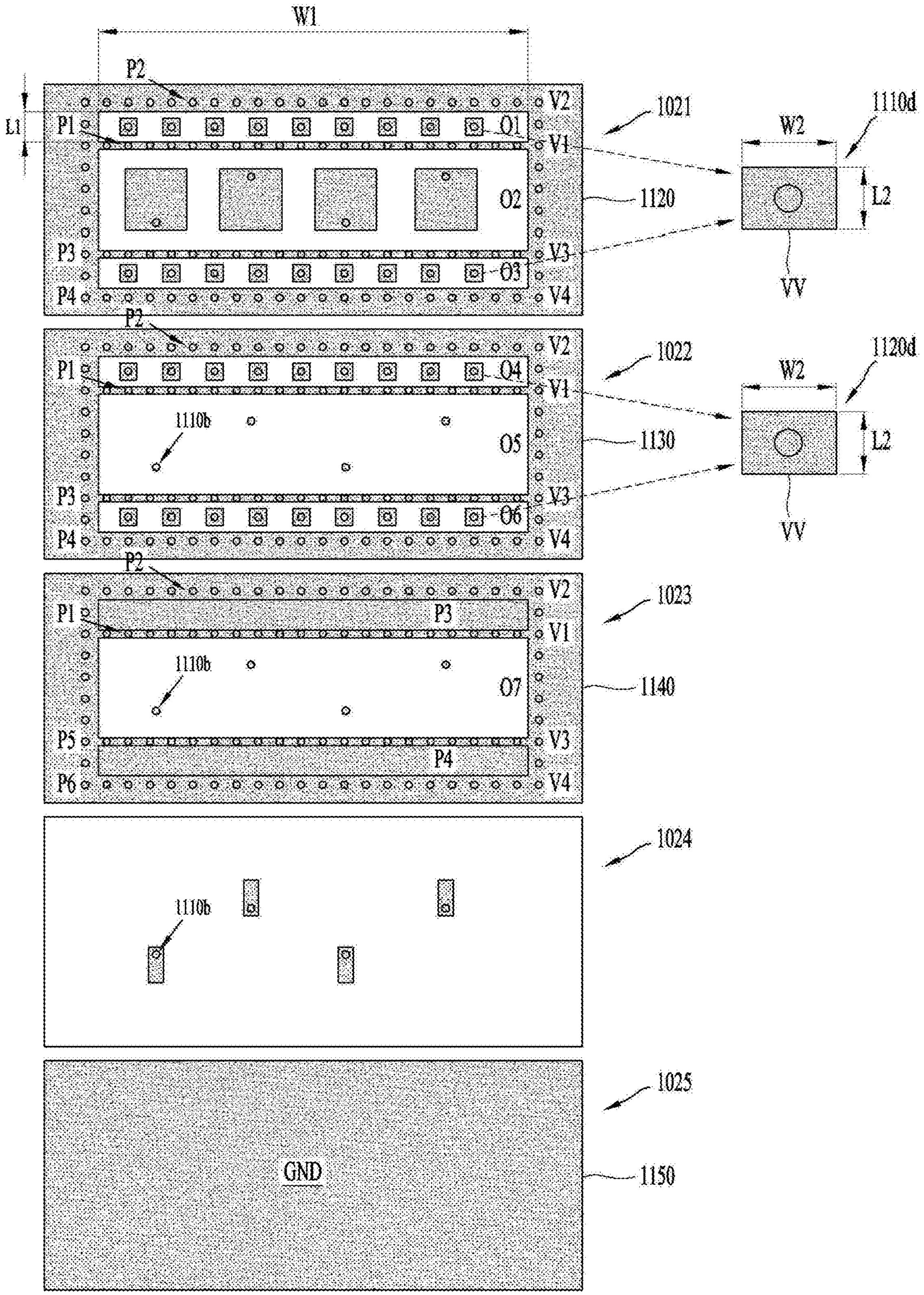
FIG. 11 illustrates a configuration of each layer in which opening regions disposed in each layer of the antenna module of FIG. 7 are shown, which is different from the configuration of FIG. 10.

FIG. 10 illustrates a structure in which a dummy pattern is arranged in an opening region of a multilayer substrate constituting the antenna module of FIG. 9. Referring to FIGS. 7, 8 and 10, the antenna module may further include a plurality of dummy patterns 1110*d* arranged in the first opening O1 on the dielectric substrate 1020. A first side value L2 of the dummy patterns 1110*d* may be set to 0<L2<L1. Here, L1 corresponds to the length L1 of the short side of the first opening O1. A second side value W2 of the dummy patterns 1110*d* may be set to 0<W2<W1. Here, W1 corresponds to the length W1 of the long side of the first opening O1.

The antenna module may further include a plurality of dummy patterns 1120*d* arranged in the third opening O3 on the dielectric substrate 1020. A first side value L2 of the dummy patterns 1120*d* may be set to 0<L2<L1. Here, L1 corresponds to the length L1 of the short side of the first opening O1. A second side value W2 of the dummy patterns 1120*d* may be set to 0<W2<W1. Here, W1 corresponds to the length W1 of the long side of the first opening O1.

A plurality of dummy patterns 1100*d* may be configured to include first patterns 1110*d* and second patterns 1120*d*. The first dummy patterns 1110*d* may be placed in the first opening O1 on the dielectric substrate 1020. The second dummy patterns 1120*d* may be placed in the third opening O3 on the dielectric substrate 1020. The plurality of first dummy patterns 1110*d* may be disposed to be electrically connected to the plurality of second dummy patterns 1120*d* through vertical conductive vias VV.

Hereinafter, openings disposed in each layer of the dielectric substrate 1020 are described in detail. The first opening O1 of the first layer 1021 may be arranged in an electric field direction of the phased array antenna 1100. Meanwhile, the first layer 1021 having the first conductive layer 1120 may further include a sixth opening O6 in a surface of the dielectric substrate 1020. In this regard, the first layer 1021 is not limited to being configured to include the first opening O1, the second opening O2, and the third opening O3.

Accordingly, the first opening O1, the second opening O2, and the sixth opening O6 may be arranged in the first layer 1021. The patch elements 1100*a* may be placed in the second opening O2, and the first opening O1 and the sixth opening O6 may be referred to as an upper opening and a lower opening.

A third part P3 and a fourth part P4 of the first conductive layer 1120 may be disposed in regions above and below the sixth opening O6 which is the lower opening, respectively. The third part P3 of the first conductive layer 1120 may be disposed between the second opening O2 and the sixth opening O6. The fourth part P4 of the first conductive layer 1120 may be disposed to face the third part P3 of the first conductive layer 1120.

The second layer 1130 having the second conductive layer 1022 may further include a seventh opening O7 in a surface of the dielectric substrate 1020. In this regard, the second layer 1022 is not limited to being configured to include the fourth opening O4, the fifth opening O5, and a sixth opening O6. Accordingly, a third opening O3, the fourth opening O4, and the seventh opening O7 may be arranged in the second layer 1022. The third opening O3 and the seventh opening O7 positioned above and below the fourth opening O4 may be referred to as an upper opening and a lower opening.

The third part P3 and a fourth part P4 of the second conductive layer 1130 may be disposed in regions above and below the seventh opening O7 which is a lower opening. The third part P3 of the second conductive layer 1130 may be disposed between the fourth opening O4 and the seventh opening O7. The fourth part P4 of the second conductive layer 1130 may be disposed to face the third part P3 of the second conductive layer 1130 in a vicinity of the seventh opening O7.

The third part P3 of the first conductive layer 1120, the third part P3 of the second conductive layer 1120, and a fifth part P5 of the third conductive layer 1130 may be disposed to be connected to each other by third conductive vias V3. The fourth part P4 of the first conductive layer 1120, the fourth part P4 of the second conductive layer 1120, and a sixth part P6 of the third conductive layer 1130 may be disposed to be connected to each other by fourth conductive vias V4. A fourth part P4 of the third conductive layer 1130 may be disposed to overlap the sixth opening O6 and the seventh opening O7. The third conductive vias V3 and the fourth conductive vias V4 may be connected to the fifth part P5 and the sixth part P6 of the third conductive layer 1140, respectively. Accordingly, the third conductive vias V3 and the fourth conductive vias V4 may be disposed to be electrically connected to the fourth part P4 of the third conductive layer 1140.

Figure 12:
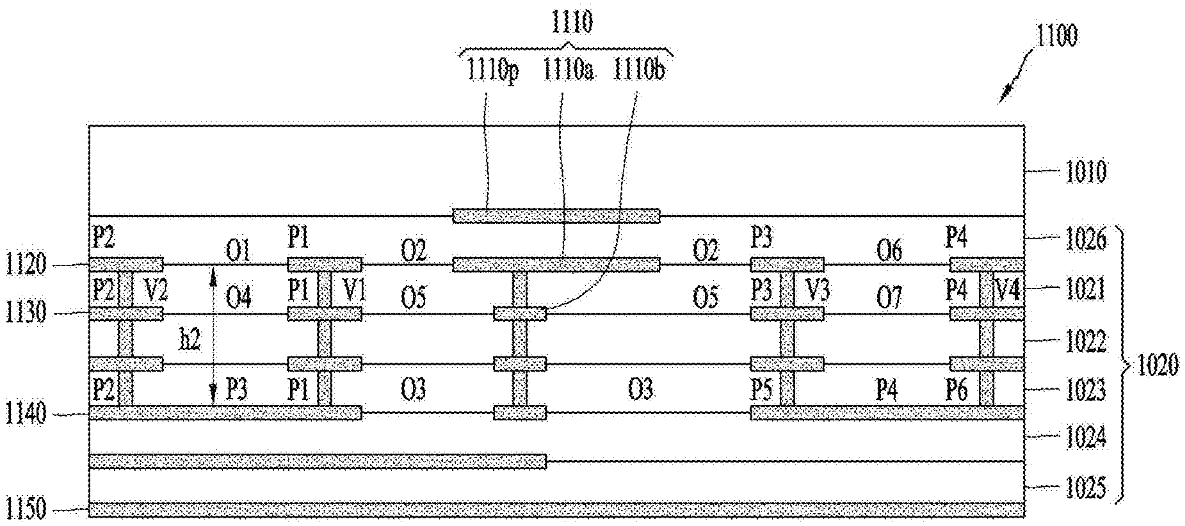
FIG. 12 is a side view of an antenna module operating in a mmWave band according to the disclosure.
Figure 13:
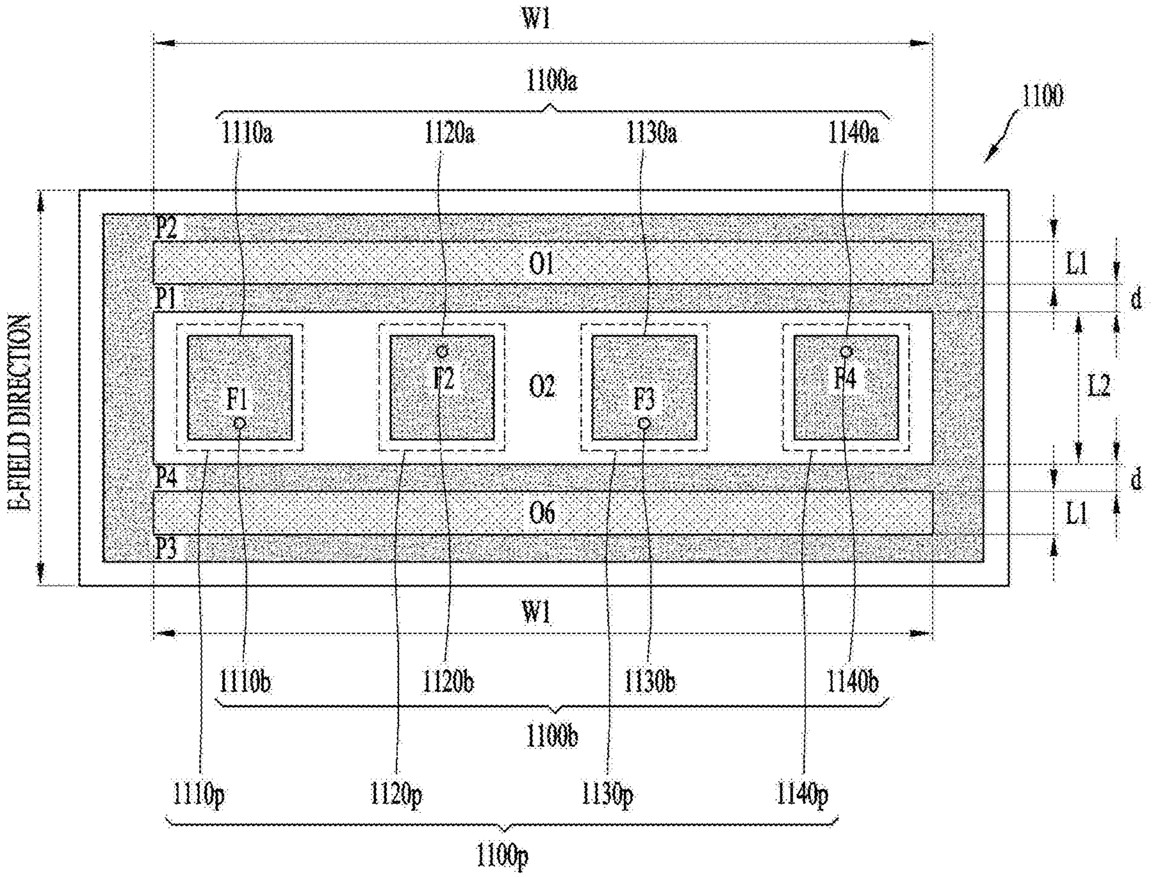
FIG. 13 is a front view of the antenna module of FIG. 12.
Figure 14:
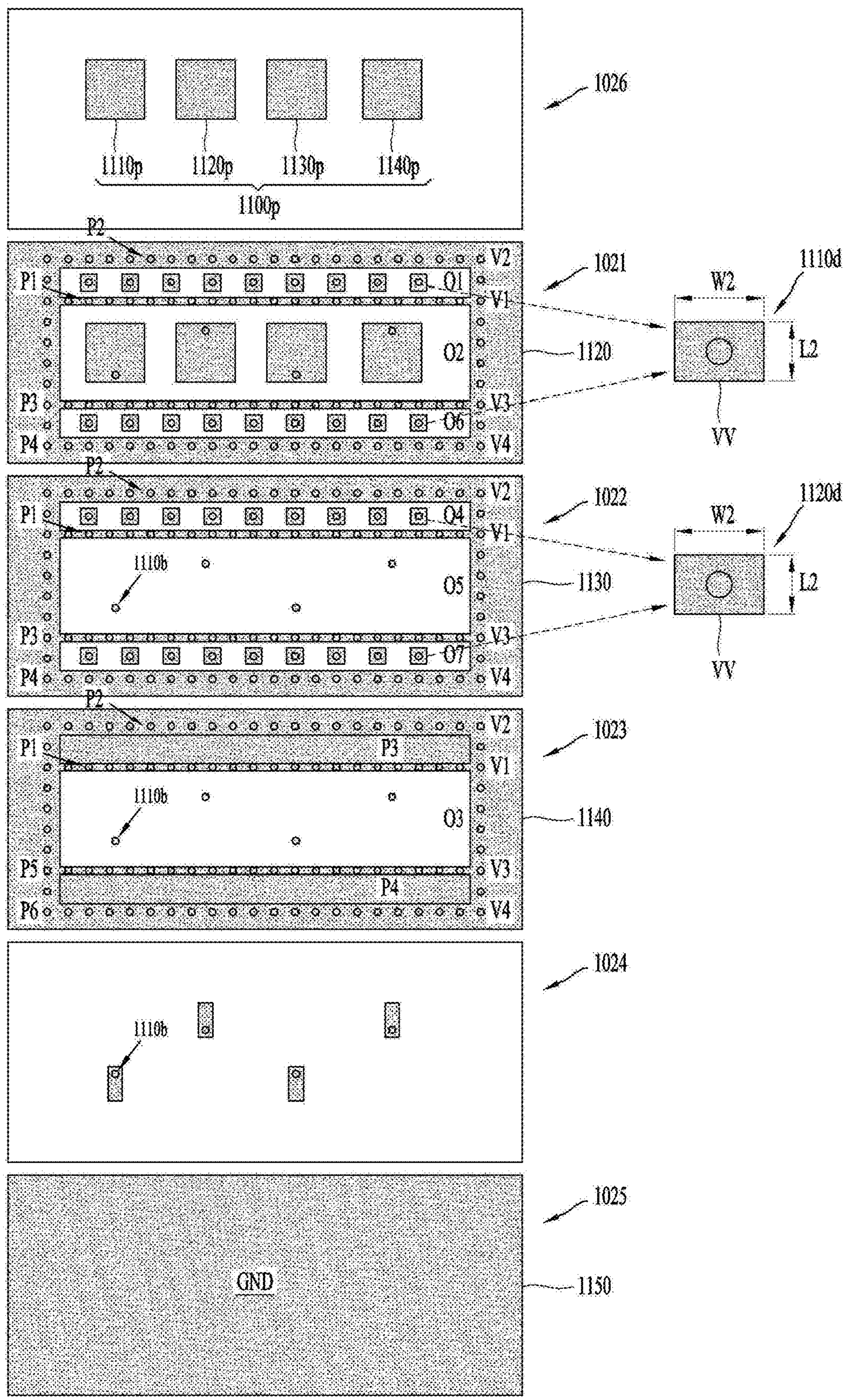
FIG. 14 illustrates a configuration of each layer of a dielectric substrate of the antenna module of FIG. 12.

Hereinafter, an antenna module operating in a mmWave band according to still another aspect of this disclosure, and an electronic device including the same are described. In relation to this, FIG. 12 is a side view of an antenna module operating in a mmWave band according to the disclosure. Meanwhile, FIG. 13 is a front view of the antenna module of FIG. 12. FIG. 14 illustrates a configuration of each layer of a dielectric substrate of the antenna module of FIG. 12.

Referring to FIGS. 12 to 14, an electronic device may be configured to have an antenna module. The antenna module may be configured to include the dielectric cover layer 1010, the dielectric substrate 1020, and the phased array antenna 1100.

The dielectric substrate 1020 of the antenna module may include a plurality of conductive layers. Each of the conductive layers constitutes a separate layer. In relation to this, the antenna element 1020 may be configured to include a first layer 1021 and a second layer 1022. The first layer 1021 and the second layer 1022 may have opening regions disposed above and below openings arranged to surround the antenna element. The dielectric substrate 1020 may be configured to further include a third layer 1023, a fourth layer 1024, and a fifth layer 1025. The third layer 1023, the fourth layer 1024, and the fifth layer 1025 may have openings disposed only in regions in which the antenna element is placed, but are not limited thereto. The dielectric substrate 1020 may further have a sixth layer 1026 disposed on the first layer 1021, wherein parasitic patch elements 1110*p* may be placed on the sixth layer 1026. The antenna element 1110 may perform broadband operation due to the patch element 1110*a* of the first layer 1021 and the parasitic patch elements 1110*p* of the sixth layer 1026.

The first layer 1021 may be configured to have a first conductive layer 1120 including a first opening O1 and a second opening O2 on a surface of the dielectric substrate 1020. A first part P1 of the first conductive layer 1120 may be disposed between the first opening O1 and the second opening O2. A second part P2 of the first conductive layer 1120 may be disposed to face the first part P1 of the first conductive layer 1120 in a vicinity of the first opening O1.

The second layer 1022 may be configured to have a second conductive layer 1130 including a fourth opening O4 and a fifth opening O5 in the dielectric substrate 1020. A first part P1 of the second conductive layer 1130 may be disposed between the fourth opening O4 and the fifth opening O5. A second part P2 of the second conductive layer 1130 may be disposed to face the first part P1 of the second conductive layer 1130 in a vicinity of the fourth opening O4.

The third layer 1023 may be disposed to have a third conductive layer 1140 including a seventh opening O7 in the dielectric substrate 1020. The fourth layer 1024 may be configured to have a plurality of conductive traces. The fourth layer 1024 may include a plurality of conductive traces defining transmission line paths. The fifth layer 1025 may be configured to have the fourth conductive layer 1150 configured to operate as ground.

The dielectric cover layer 1010 may be placed in a region above the dielectric substrate 1020. The dielectric cover layer 1010 may be configured as a dielectric structure of the electronic device, and may function as a cover or a radome to prevent the phased array antenna 1100 from being exposed to outside. The dielectric substrate 1020 may be configured to have a surface mounted to face the dielectric cover layer.

The phased array antenna 1100 may be disposed on the dielectric substrate 1020. The phased array antenna 1100 may include parasitic patch elements 1100*p* on a surface of the dielectric substrate 1020, and the plurality of patch elements 1100*a* and the transmission line paths 1100*b* both in the dielectric substrate 1020. The transmission line paths 1100*b* may be configured to be coupled to respective positive antenna feed terminals F1 to F4 on the patch elements 1100 in the dielectric substrate 1020. The patch elements 1100*a* may be configured to include the first to fourth patch elements 1110*a* to 1110*d*. The transmission line paths 1100*b* may be configured to include first to fourth transmission line paths 1110*b* to 1140*d*. The parasitic patch elements 1100*p* may be configured to include first to fourth parasitic patch elements 1110*p* to 1140*p*.

In this regard, a number of the plurality of patch elements is not limited to four, and may be modified to two, four, six, eight, ten, twelve, or sixteen depending on an application. The phased array antenna 1100 may be configured to transmit radio-frequency signals at a frequency between 10 GHz and 300 GHz through the dielectric cover layer 1010. The phased array antenna 1100 may be configured to perform beam forming to change a direction of a beam by controlling a phase of a signal applied to the plurality of patch elements 1100*a*.

The patch elements 1100*a* may be placed in the second opening O2 in the first conductive layer 1120. The transmission line paths 1100*b* may be placed in the fifth opening O5 in the second layer 1022 and the third opening O3 in the third layer 1020. The first part P1 of the first conductive layer 1120, the first part P1 of the second conductive layer 1130, and a first part P1 of the third conductive layer 1140 may be connected to each other by the first conductive vias V1. The second part P2 of the first conductive layer 1120, the second part P2 of the second conductive layer 1130, and a second part P2 of the third conductive layer 1140 may be connected to each other by the second conductive vias V2. The first parts P1 and the second parts P2 of the first conductive layer 1110, the second conductive layer 1120, and the third conductive layer 1130 may be disposed to correspond to each other in each layer. The third conductive layer 1130 may have a third part P3 between the first part P1 and the second part P2, the third part P3 being a metal region instead of an opening region.

The third part P3 of the third conductive layer 1140 may be disposed to overlap the first opening O1 and the fourth opening O4. The first conductive vias V1 and the second conductive vias V2 may be configured to be electrically connected to the third part P3 of the third conductive layer 1140. The first conductive vias V1 and the second conductive vias V2 may be configured to be electrically connected to the third part P3 of the third conductive layer 1140.

The second layer 1022 may be configured to include a plurality of layers in the dielectric substrate 1020. A length of a long side of the second opening O2 may be configured to be equal to or greater than a length of a long side of the first opening O1. In this regard, a length W1 of the long side of the first opening O1 may be configured to be equal to greater than $\lambda_0$. A length L1 of a short side of the first opening O1 may be configured to be equal to or greater than $0.13\lambda_0$.

An interval distance h1 from a surface of the first layer 1021 to a surface of the third layer 1023 may be configured to be equal to or greater than $0.02\lambda_0$. An interval distance d from an edge of the first opening O1 to an edge of the second opening O2 may be configured to be equal to or greater than $0.13\lambda_0$.

The antenna module may further include the plurality of dummy patterns 1110*d* arranged in the first opening O1 on the dielectric substrate 1020. A first side value L2 of the dummy patterns 1110*d* may be set to 0<L2<L1. Here, L1 corresponds to the length L1 of the short side of the first opening O1. A second side value W2 of the dummy patterns 1110*d* may be set to 0<W2<W1. Here, W1 corresponds to the length W1 of the long side of the first opening O1.

The antenna module may further include a plurality of dummy patterns 1120*d* arranged in the third opening O3 on the dielectric substrate 1020. A first side value L2 of the dummy patterns 1120*d* may be set to 0<L2<L1. Here, L1 corresponds to the length L1 of the short side of the first opening O1. A second side value W2 of the dummy patterns 1120*d* may be set to 0<W2<W1. Here, W1 corresponds to the length W1 of the long side of the first opening O1.

A plurality of dummy patterns 1100*d* may be configured to include first patterns 1110*d* and second patterns 1120*d*. The first dummy patterns 1110*d* may be placed in the first opening O1 on the dielectric substrate 1020. The second dummy patterns 1120*d* may be placed in the third opening O3 on the dielectric substrate 1020. The plurality of first dummy patterns 1110*d* may be disposed to be electrically connected to the plurality of second dummy patterns 1120*d* through vertical conductive vias VV.

Hereinafter, openings disposed in each layer of the dielectric substrate 1020 are described in detail. The first opening O1 of the first layer 1021 may be arranged in an electric field direction of the phased array antenna 1100. Meanwhile, the first layer 1021 having the first conductive layer 1120 may further include a sixth opening O6 in a surface of the dielectric substrate 1020. In this regard, the first layer 1021 is not limited to being configured to include the first opening O1, the second opening O2, and the third opening O3. Accordingly, the first opening O1, the second opening O2, and the sixth opening O6 may be arranged in the first layer 1021. the patch elements 1100*a* may be placed in the second opening O2, and the first opening O1 and the sixth opening O6 may be referred to as an upper opening and a lower opening.

The third part P3 and the fourth part P4 of the first conductive layer 1120 may be disposed in regions above and below the sixth opening O6, which is the lower opening. The third part P3 of the first conductive layer 1120 may be disposed between the second opening O2 and the sixth opening O6. The fourth part P4 of the first conductive layer 1120 may be disposed to face the third part P3 of the first conductive layer 1120.

The second layer 1130 having the second conductive layer 1022 may further include a seventh opening O7 in a surface of the dielectric substrate 1020. In this regard, the second layer 1022 is not limited to being configured to include the fourth opening O4, the fifth opening O5, and a sixth opening O6. Accordingly, the third opening O3, the fourth opening O4, and the seventh opening O7 may be arranged in the second layer 1022. The third opening O3 and the seventh opening O7 positioned above and below the fourth opening O4 may be referred to as an upper opening and a lower opening.

The third part P3 and a fourth part P4 of the second conductive layer 1130 may be disposed in regions above and below the sixth opening O7 which is a lower opening. The third part P3 of the second conductive layer 1130 may be disposed between the fourth opening O4 and the fifth opening O7. The fourth part P4 of the second conductive layer 1130 may be disposed to face the third part P3 of the second conductive layer 1130 in a vicinity of the seventh opening O7.

The third part P3 of the first conductive layer 1120, the third part P3 of the second conductive layer 1120, and a fifth part P5 of the third conductive layer 1130 may be disposed to be connected to each other by third conductive vias V3. The fourth part P4 of the first conductive layer 1120, the fourth part P4 of the second conductive layer 1120, and the sixth part P6 of the third conductive layer 1130 may be disposed to be connected to each other by fourth conductive vias V4. The sixth part P6 of the third conductive layer 1130 may be disposed to overlap the sixth opening O6 and the seventh opening O7. The third conductive vias V3 and the fourth conductive vias V4 may be disposed to be electrically connected to the sixth part P6 of the third conductive layer 1140.

Figure 15:
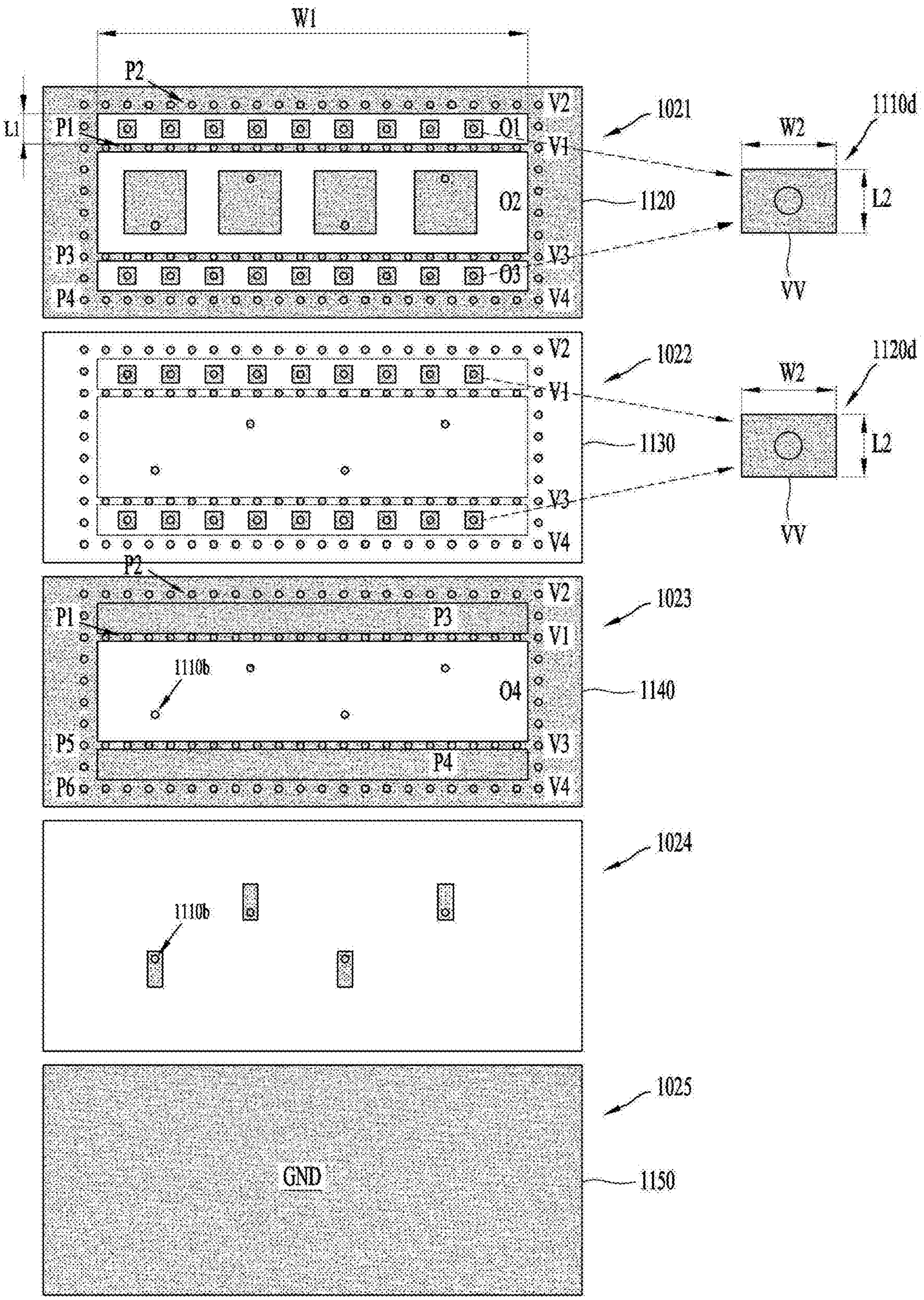
FIG. 15 illustrates a configuration of layers in a dielectric substrate having a structure in which conductive vias are connected to each other in a particular layer, instead of disposition of a conductive layer, in the antenna module of FIG. 7 or FIG. 12.

Hereinafter, an antenna module operating in a mmWave band according to still another aspect of this disclosure, and an electronic device including the antenna module are described. In this regard, FIG. 15 illustrates a configuration of layers in a dielectric substrate having a structure in which conductive vias are connected to each other in a particular layer, instead of disposition of a conductive layer, in the antenna module of FIG. 7 or FIG. 12. Referring to FIGS. 7, 12, and 15, the electronic device may be configured to have an antenna module. The antenna module may be configured to include a dielectric cover layer 1010, a dielectric substrate 1020, and a phased array antenna 1100.

Referring to FIG. 7, FIG. 12, and FIG. 15, the dielectric substrate 1020 of the antenna module may include a plurality of conductive layers. Each of the conductive layers constitutes a separate layer. In relation to this, the antenna element 1020 may be configured to include a first layer 1021 and a second layer 1022. The first layer 1021 and the second layer 1022 may have opening regions disposed above and below openings disposed to surround an antenna element. The dielectric substrate 1020 may be configured to further include a third layer 1023, a fourth layer 1024, and a fifth layer 1025. The third layer 1023, the fourth layer 1024, and the fifth layer 1025 may have openings disposed only in regions in which the antenna element is placed, but are not limited thereto.

The first layer 1021 may be configured to have a first conductive layer 1120 including a first opening O1, a second opening O2, and a sixth opening O6 on a surface of the dielectric substrate 1020. A first part P1 of the first conductive layer 1120 may be disposed between the first opening O1 and the second opening O2. A second part P2 of the first conductive layer 1120 may be disposed to face the first part P1 of the first conductive layer 1120 in a vicinity of the first opening O1. A third part P3 of the first conductive layer 1120 may be disposed between the second opening O2 and the sixth opening O6. A fourth part P4 of the first conductive layer 1120 may be disposed to face the third part P3 of the first conductive layer 1120 in a vicinity of the seventh opening O6.

The second layer 1022 may be configured to have a second conductive layer 1130 including a fourth opening O4, a fifth opening O5, and a seventh opening O7 in the dielectric substrate 1020. A first part P1 of the second conductive layer 1130 may be disposed between the fourth opening O4 and the fifth opening O5. A second part P2 of the second conductive layer 1130 may be disposed to face the first part P1 of the second conductive layer 1130 in a vicinity of the fourth opening O4. A third part P3 of the second conductive layer 1130 may be disposed between the second opening O5 and the seventh opening O7. A fourth part P4 of the second conductive layer 1130 may be disposed to face the third part P3 of the second conductive layer 1130 in a vicinity of the seventh opening O7.

The third layer 1023 may be configured to have a third conductive layer 1140 including a third opening O3 in the dielectric substrate 1020. The fourth layer 1024 may be configured to have a plurality of conductive traces. The fourth layer 1024 may include a plurality of conductive traces defining transmission line paths. Each of first to fourth conductive traces CT1 to CT4 may include a transmission line path connected to a patch element in a form of a conductive via and a connection line path connected to an RFIC in a form of a conductive via. For example, a conductive trace of the fourth layer 1024 may include a transmission line path 1110*b* and a connection line path 1110*c*. Each of the first to fourth conductive traces CT1 to CT4 may be disposed to be spaced apart from a conductive layer constituting the fourth layer 1024. The fifth layer 1025 may be disposed to have a fourth conductive layer 1150 configured to operate as ground.

The dielectric cover layer 1010 may be placed on a region above the dielectric substrate 1020. The dielectric cover layer 1010 may be configured as a dielectric structure of the electronic device, and may function as a cover or a radome to prevent the phased array antenna 1100 from being exposed to outside. The dielectric substrate 1020 may be configured to have a surface mounted to face the dielectric cover layer.

The phased array antenna 1100 may be disposed on the dielectric substrate 1020. The phased array antenna 1100 may include a plurality of patch elements 1100*a* and transmission line paths 1100*b* on a surface of the dielectric substrate 1020. The transmission line paths 1100*b* may be configured to be coupled to respective positive antenna feed terminals F1 to F4 on the patch elements 1100 in the dielectric substrate 1020. The patch elements 1100*a* may be configured to include the first to fourth patch elements 1110*a* to 1110*d*. The transmission line paths 1100*b* may be configured to include first to fourth transmission line paths 1110*b* to 1140*d*.

The first to fourth positive antenna feed terminals F1 to F4 may be arranged at same positions in the first to fourth patch elements 1110*a* to 1110*d*, but are not limited thereto. As another example, as shown in FIGS. 9 and 14, the first to fourth positive antenna feed terminals F1 to F4 may be disposed to be symmetrical to center lines of the first to fourth patch elements 1110*a* to 1110*d*.

A number of the plurality of patch elements is not limited to four, and may be modified to two, four, six, eight, ten, twelve, or sixteen depending on an application. The phased array antenna 1100 may be configured to transmit radio-frequency signals at a frequency between 10 GHz and 300 GHz through the dielectric cover layer 1010. The phased array antenna 1100 may be configured to perform beam forming to change a direction of a beam by controlling a phase of a signal applied to the plurality of patch elements 1100*a*.

The patch elements 1100*a* may be placed in the second opening O2 in the first conductive layer 1120. The transmission line paths 1100*b* may be placed in the fifth opening O5 in the second layer 1022 and the third opening O3 in the third layer 1020. The first part P1 of the first conductive layer 1120, the first part P1 of the second conductive layer 1130, and the first part P1 of the third conductive layer 1140 may be connected by the first conductive vias V1. The second part P2 of the first conductive layer 1120, the second part P2 of the second conductive layer 1130, and the second part P2 of the third conductive layer 1140 may be connected to each other by the second conductive vias V2. The first parts P1 and the second parts P2 of the first conductive layer 1110, the second conductive layer 1120, and the third conductive layer 1130 may be disposed to correspond to each other in each layer. The third conductive layer 1130 may have a third part P3 between the first part P1 and the second part P2, the third part P3 being a metal region instead of an opening region.

The third part P3 of the third conductive layer 1140 may be disposed to overlap the first opening O1 and the fourth opening O1. The first conductive vias V1 and the second conductive vias V2 may be configured to be electrically connected to the third part P3 of the third conductive layer 1140. The third part P3 of the first conductive layer 1120, the third part P3 of the second conductive layer 1130, and a fourth part P4 of the third conductive layer 1140 may be connected to each other by third conductive vias V3. The fourth part P4 of the first conductive layer 1120, the fourth part P4 of the second conductive layer 1130, and the sixth part P6 of the third conductive layer 1140 may be connected to each other by fourth conductive vias V4. The third conductive vias V3 and the fourth conductive vias V4 may be configured to be electrically connected to the sixth part P6 of the third conductive layer 1140.

Figure 16:
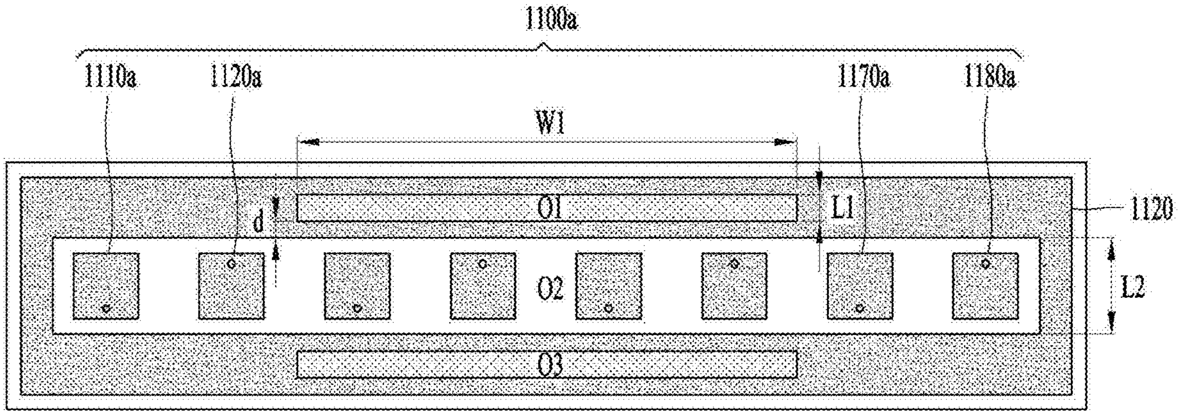
FIG. 16 illustrates a structure in which a length of an opening in the U-shaped slot wall structure is configured to be shorter than a length of an antenna in the antenna module according to this disclosure.

Meanwhile, in the antenna module having a U-shaped slot wall structure operating in the mmWave band according to this disclosure, the U-shaped slot wall structure may be variously modified. In relation to this, FIG. 16 illustrates a structure in which a length of an opening in the U-shaped slot wall structure is configured to be shorter than a length of an antenna in the antenna module according to this disclosure. Referring to FIG. 16, eight patch elements 1100*a* are present, and a length of an opening in the U-shaped slot wall structure corresponds to a length of arrangement including four patch elements. The patch elements 1100*a* may include first to eighth patch elements 1110*a* to 1180*a*, but are not limited thereto. Two, four, six, eight, ten, twelve, or sixteen patch elements 1100*a* may be present depending on an application. A length W2 of a long side of the second opening O2 in which the patch elements 1100*a* are arranged may be configured to be greater than a length W1 of long sides of the first opening O1 and the third opening O3.

Figure 17A:
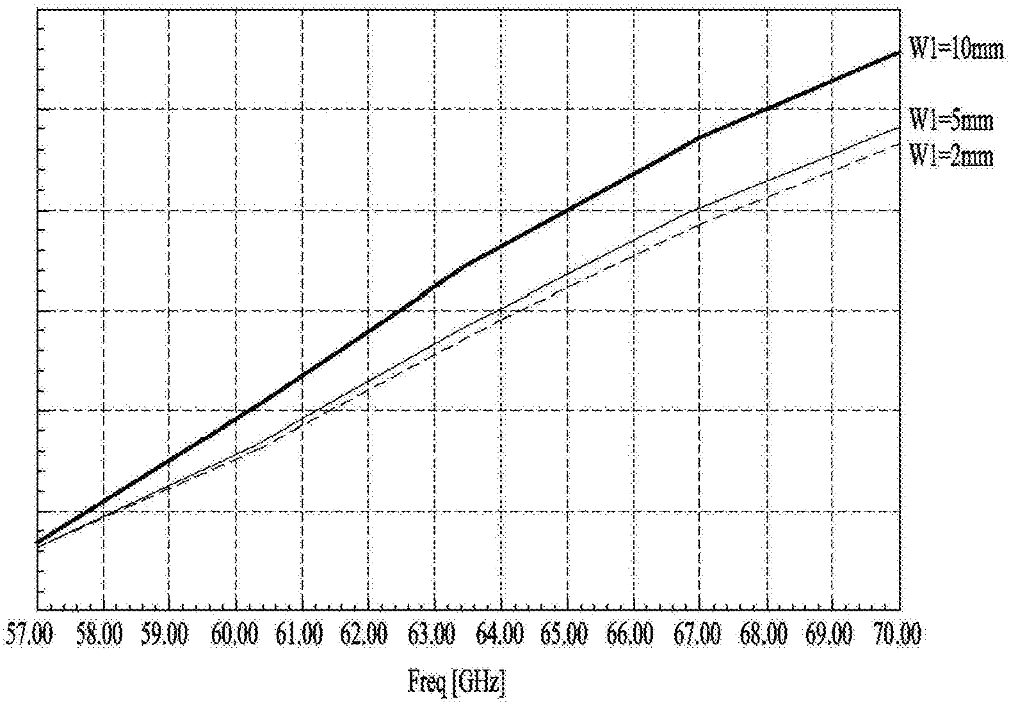
FIGS. 17A and 17B illustrate antenna gain characteristics according to a change in lengths of openings in the antenna module of FIG. 16.
Figure 17A:
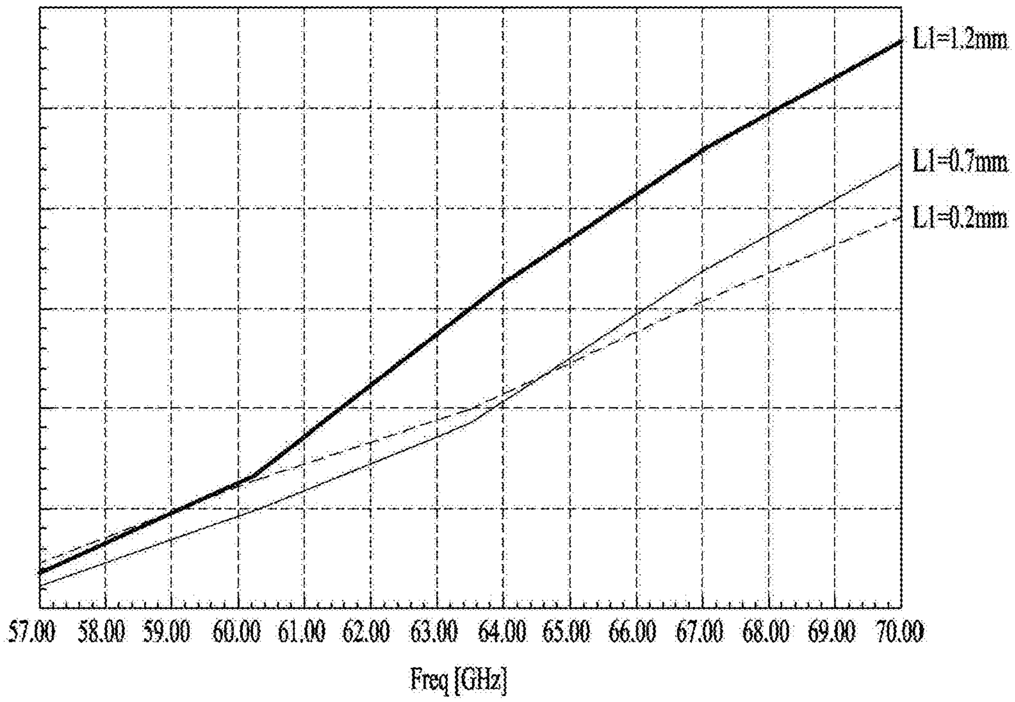
Figure 17B:
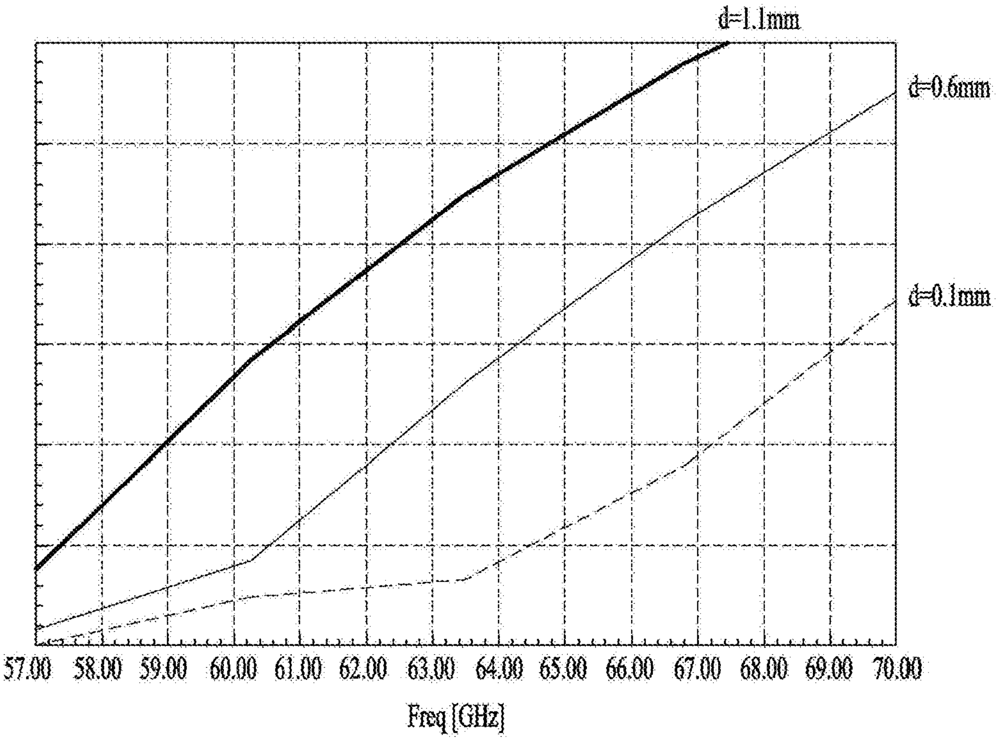
Figure 17B:
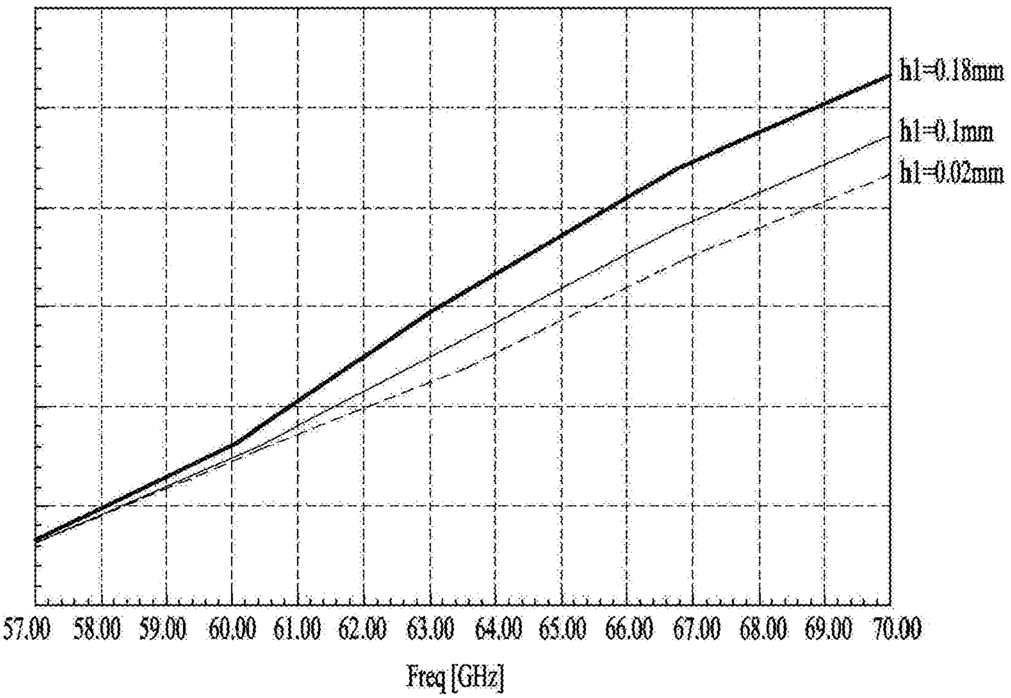

FIGS. 17A and 17B illustrate antenna gain characteristics according to a change in lengths of openings in the antenna module of FIG. 16. Referring to FIG. 16 and (a) of FIG. 17A, antenna gain characteristics according to a change in the length W1 of the long sides of the first opening O1 and the third opening O3 are shown. Referring to FIG. 16 and (b) of FIG. 17A, antenna gain characteristics according to a change in a length L1 of short sides of the first opening O1 and the third opening O3 are shown. Referring to FIG. 16 and (a) of FIG. 17B, antenna gain characteristics according to a change in a distance d between the first opening O1 and the second opening O2 are shown. Referring to FIG. 7 and (b) of FIG. 17B, antenna gain characteristics according to a change in a height h of a U-shaped wall are shown.

Referring to FIGS. 16 to 17B, when eight patch antennas are arranged, a change in antenna gain performance according to changes in W1, L1, d, and h1 are shown. An operating frequency band is 57 to 70 GHz, and may be based on 60 GHz. A length of one wavelength corresponding to 60 GHz in air is 5 mm. Referring to (a) of FIG. 17A, when W1=2 mm, an antenna performance condition is not satisfied and antenna performance is worst. It may be understood that as W1 is increased from 5 mm to 10 mm, antenna gain performance is continuously improved. Therefore, it may be determined that W1 is equal to or greater than one wavelength corresponding to 5 mm with respect to 60 GHz. Referring to (b) of FIG. 17A, antenna performance is worst when L1=0.2 mm. When L1=0.7 mm, antenna gain performance begins to improve in a high frequency band. When L1 is continuously increased to 1.2 mm, L1 has high antenna gain performance. Therefore, it may be determined that L1 is equal to or greater than 0.13 wavelength corresponding to approximately 0.65 mm with respect to 60 GHz.

Referring to (a) of FIG. 17B, it may be understood that antenna performance is worst when d=0.1 mm, and an antenna gain is increased an order increasing from d=0.6 mm to 1.1 mm. Therefore, it may be determined that L1 is equal to or greater than 0.12 wavelength corresponding to about 0.6 mm with respect to 60 GHz. Referring to (b) FIG. 17B, it may be understood that antenna performance is worst when h1=0.02 mm, and an antenna gain is increased in an order increasing from h1=0.1 mm to 0.18 mm. Therefore, it may be determined that h1 is equal to or greater than 0.02 wavelength corresponding to approximately 0.1 mm with respect to 60 GHz.

Figure 18:
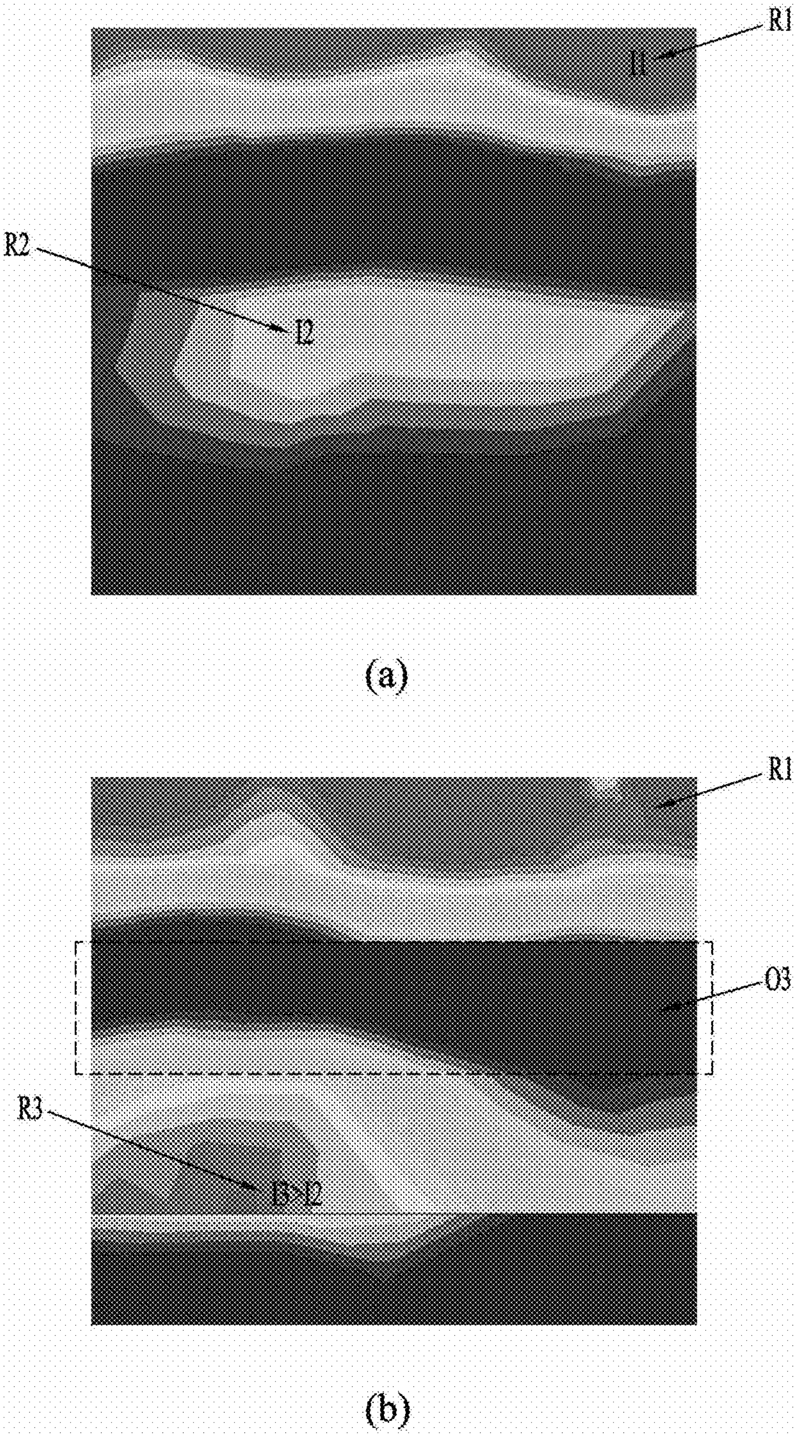
FIG. 18 illustrates electric field distribution in openings and in a vicinity of the openings according to whether the openings are disposed in a lower region of a conductive layer of FIG. 16.

In this regard, a principle in which current distribution is changed and an antenna gain is improved when opening regions (slot areas) are arranged in a plurality of conductive layers of an antenna module is described. FIG. 18 illustrates electric field distribution in openings and in a vicinity of the openings according to whether the openings are disposed in a lower region of a conductive layer of FIG. 16.

Referring to FIGS. 16 and 18, as an opening O3 is disposed in a lower region of the conductive layer 1120, an antenna gain may be improved in the opening O3 and a vicinity thereof. In this regard, (a) of FIG. 18 is a current distribution diagram illustrating a case when an opening is not disposed in a lower region of a conductive layer. (b) of FIG. 18 is a current distribution diagram illustrating a case when the opening O3 is disposed in a lower region of the conductive layer 1120 as shown in FIG. 16.

Referring to (a) of FIG. 18, when an opening region (a slot region) is not disposed, a current generated by an antenna element in a first ground region R1 of the conductive layer is supplied to have a large value, i.e., a first current value I1. Additionally, a the second ground region R2 of the conductive layer, a current is supplied to have a second current value I2 smaller than the first current value.

Referring to (a) of FIG. 18, when an opening region (a slot region) is disposed, a current generated by an antenna element in a first ground region R1 of a conductive layer is supplied to have a large value, i.e., the first current value I1. Additionally, in the second ground region R2 of the conductive layer, a current is supplied to have a third current value I3 greater than the second current value. An opening O3 may be arranged between the first and second ground regions R1 and R2. Therefore, a large current is supplied in the first and second ground regions R1 and R2 of the conductive layer in upper and lower regions of the opening O3. Accordingly, since a strong electric field may be induced by high current occurring in ground, an antenna gain is improved.

Figure 19A:
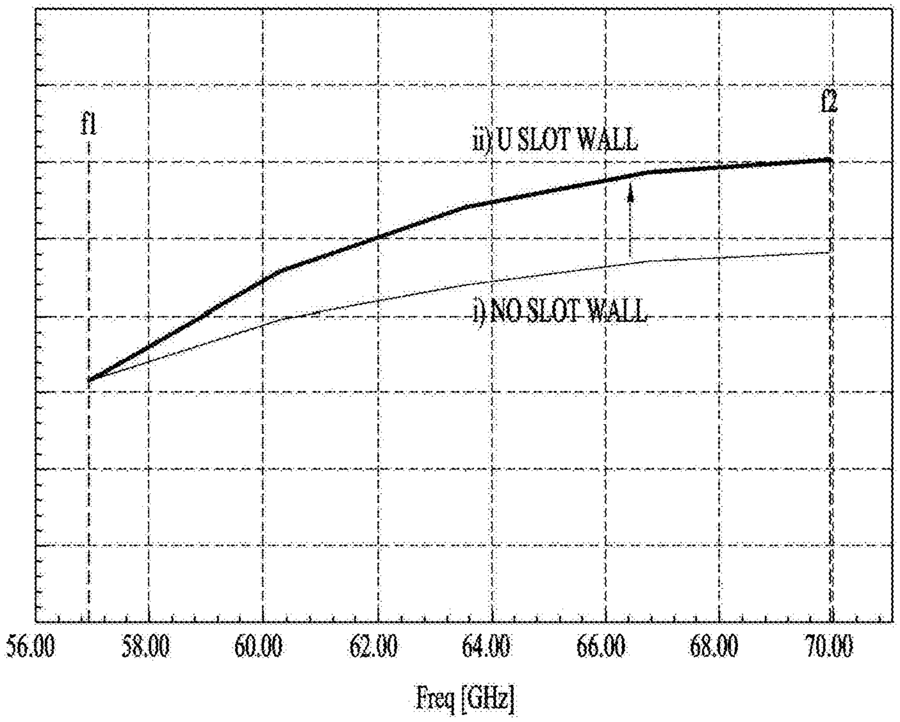
FIGS. 19A and 19B illustrate antenna gains and radiation patterns according to whether a U-shaped slot wall structure is present.
Figure 19A:
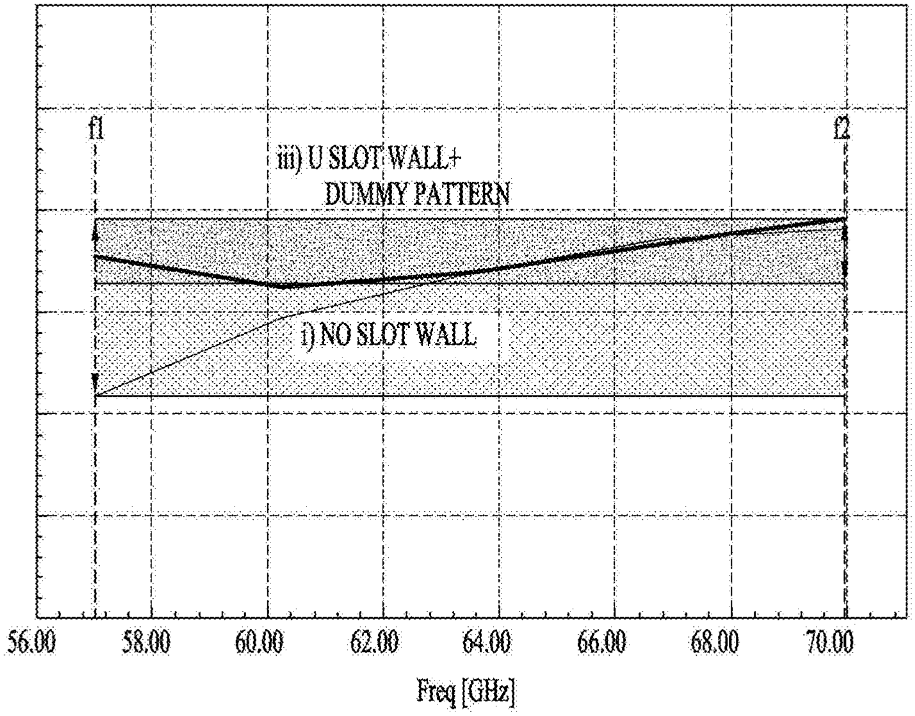
Figure 19B:
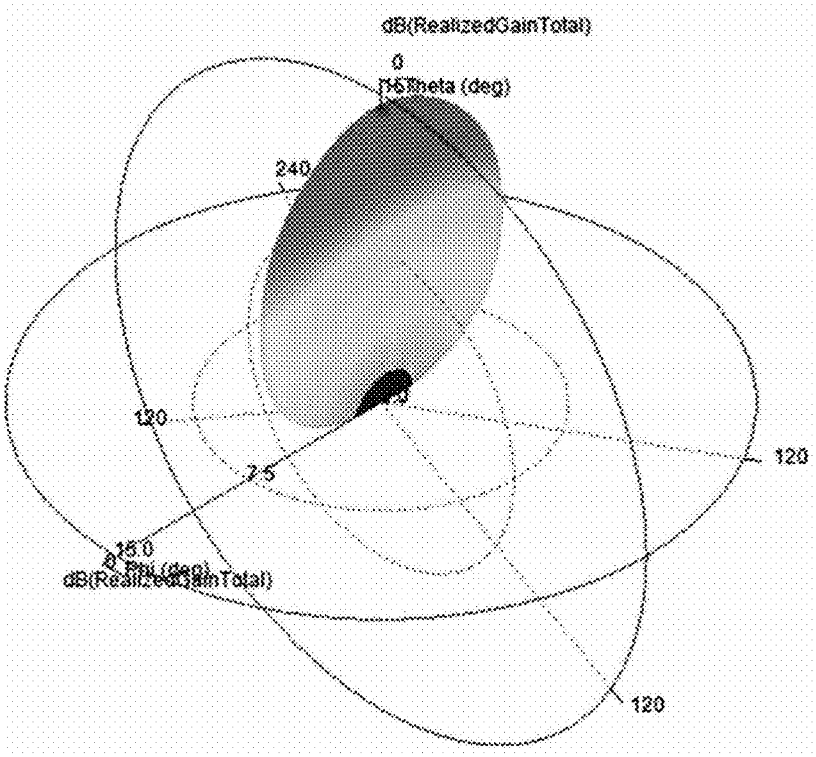

Meanwhile, a broadband antenna module having a U-shaped slot wall structure according to this disclosure has an improved antenna gain over a structure without a slot wall structure in a whole mmWave band. In this regard, FIGS. 19A and 19B illustrate antenna gains and radiation patterns according to whether a U-shaped slot wall structure is present. In this regard, an operating frequency bandwidth of an antenna module may be set such that f1=57 GHz and f2=70 GHz, but is not limited thereto.

(a) of FIG. 19A shows a comparison between antenna gains of i) an antenna module without a U-slot wall and ii) an antenna module having a U-slot wall placed in an upper portion and a lower portion of a patch element. (b) of FIG. 19A shows a comparison between antenna gains of i) an antenna module without a U-slot wall and iii) an antenna module having a dummy pattern disposed inside a U-slot wall.

Referring to (a) of FIG. 19A, it may be understood that an array patch antenna gain is improved by +1 dB or more at all frequencies by applying a U slot wall. Referring to (b) of FIG. 19A, an antenna gain may be improved in a low frequency band by arranging dummy patches in a U-shaped slot wall Additionally, it may be understood that antenna gains and flatness for each frequency are improved. It may be understood that as dummy patches are arranged in the U-shaped slot wall, an antenna gain deviation is reduced to 1 dB or less in a whole frequency band. Thus, since flatness characteristics of an array antenna gain in the mmWave band may be improved, communication performance may be improved over a whole operating frequency band.

Referring to FIG. 19B, it may be understood that beam distortion or sidelobes does not occur even in a three-dimensional (3D) radiation pattern, and gain performance of a patch antenna array is improved. In this regard, as a U-slot wall having a dummy pattern disposed therein is applied, an array patch antenna gain is improved by +2 dB or more at a specific frequency. Additionally, as shown in FIG. 19B, since sidelobes according to side radiation does not occur, antenna efficiency may be improved.

Figure 20A:
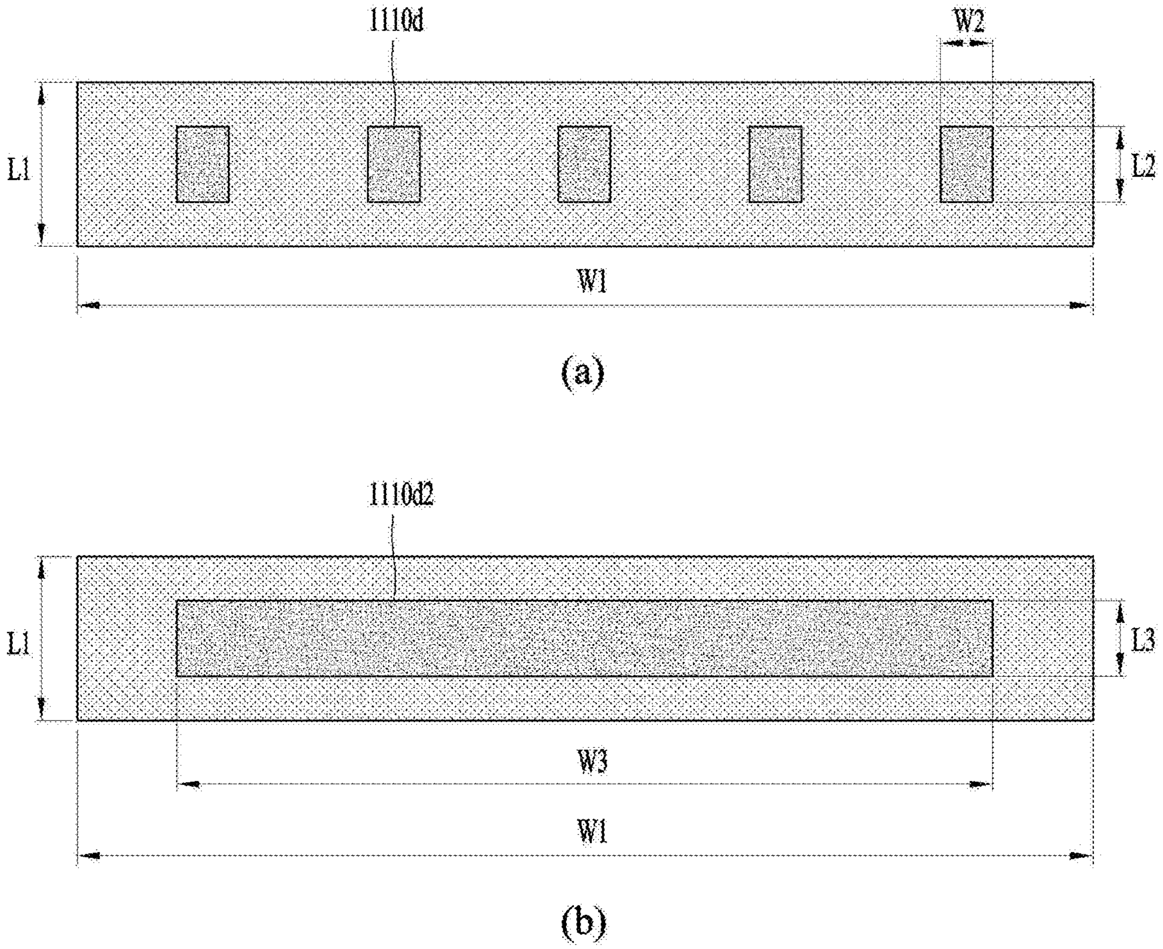
FIGS. 20A and 20B illustrate a dummy pattern structure according to various embodiments of this disclosure.
Figure 20B:
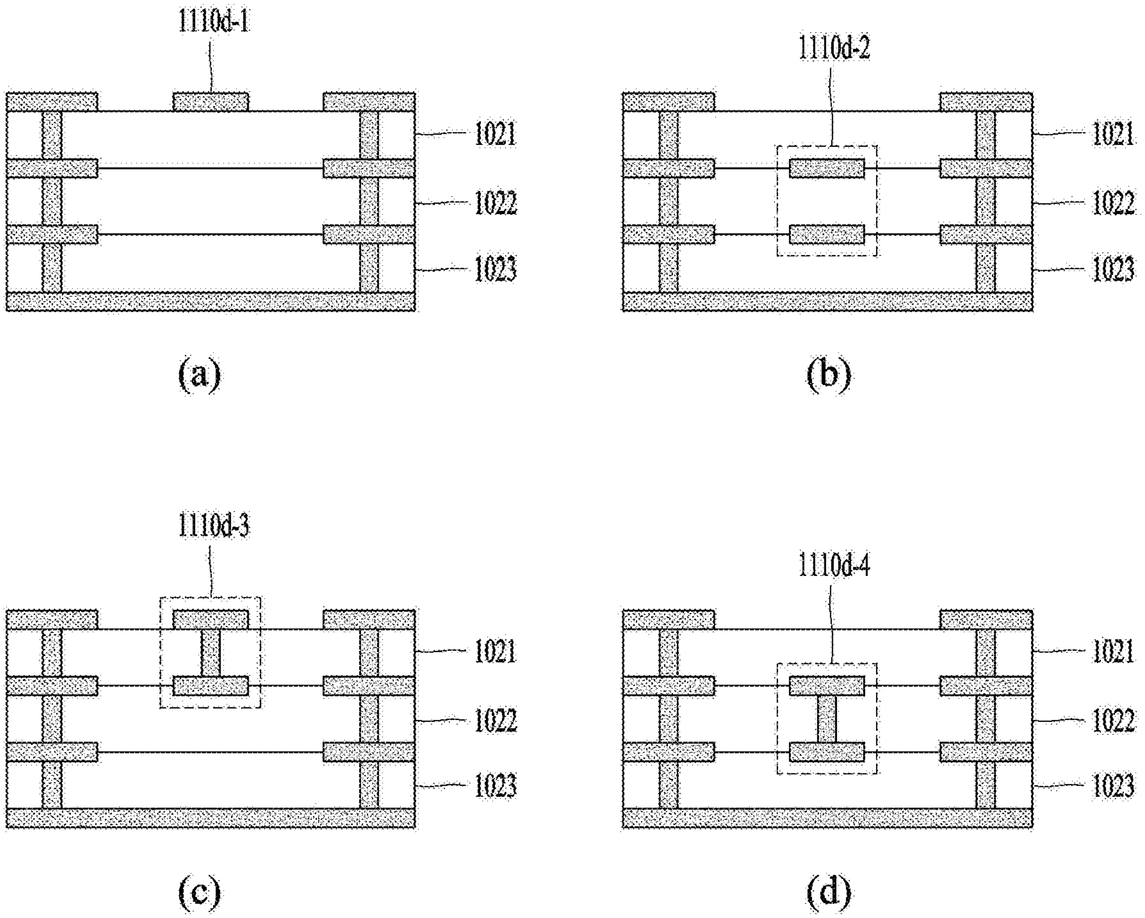

Meanwhile, in the broadband antenna module according to this disclosure, the U-shaped slot wall structure may be variously modified. In relation to this, FIGS. 20A and 20B illustrate a dummy pattern structure according to various embodiments of this disclosure. In this regard, the dummy pattern structures of FIGS. 20A and 20B may be applied to the antenna modules of FIGS. 7 to 16. In this regard, since a dummy pattern is configured as a flat-type metal patch on each layer of a multilayered dielectric substrate, the dummy pattern may also be referred to as a dummy patch.

Referring to FIG. (a) of 20A, a plurality of dummy patterns 1110*d* may be arranged to be apart from each other by a predetermined space in an opening. In this regard, the predetermined space between the dummy patterns 1110*d* may correspond to a space between patch elements. The dummy patterns 1110*d* may be configured to have a second length L2 and a second width W2.

Referring to FIG. (b) of 20A, one long dummy pattern 1110*d*2 may be placed inside an opening. In this regard, the dummy pattern 1110*d*2 may be configured to have a third length L3 and a third width W3. The third length L3 of the dummy pattern 1110*d*2 may be configured to be less than a length L1 of a short side of the opening. The third width W3 of the dummy pattern 1110*d*2 may be configured to be less a length W1 of a long side of the opening.

(a) to FIG. 20B to (d) of FIG. 20 illustrate dummy pattern structures according to embodiments. (a) of FIG. 20B illustrates a structure in which a dummy pattern 1110*d*-1 is placed only on a first layer 1021. (b) of FIG. 20B illustrates a structure in which a dummy pattern 1110*d*-2 is placed on second and third layers 1022 and 1023. (c) of FIG. 20B illustrates a structure in which a dummy patterns 1110*d*-3 is placed on the first and second layers 1021 and 1022 and connected by vertical vias VV. (d) of FIG. 20B illustrates a structure in which a dummy pattern 1110*d*-4 is placed on the second and third layers 1022 and 1023 and connected by vertical vias VV.

Referring to the cross-sectional view of FIG. 20B, the layer of the dummy patterns 1110*d*-1 to 1110*d*-4 may be positioned in any layer of an inner layer. In an embodiment, when it is assumed that a ground is present below the third layer 1023, the dummy pattern may be placed at any location in the first to third layers 1021 to 1023. The dummy patterns may be placed simultaneously on two or more layers among the first to third layers 1021 to 1023. Additionally, the dummy patterns 1110*d*-3 and 1110*d*-4 on different layers may be connected to each other by vertical vias VV.

The structural features of an antenna module (phased array antenna) operating in the mmWave band according to the disclosure have been described above. Hereinafter, a description will be given in detail of a stacked structure, in which a patch element of a phased array antenna, a dielectric substrate, and a dielectric cover layer, and electrical characteristics of the stacked structure according to the disclosure. In this regard, FIG. 21 is a view of a structure in which a dielectric substrate, on which a phased array antenna is formed, is coupled with a dielectric cover layer and a display.

Figure 21:
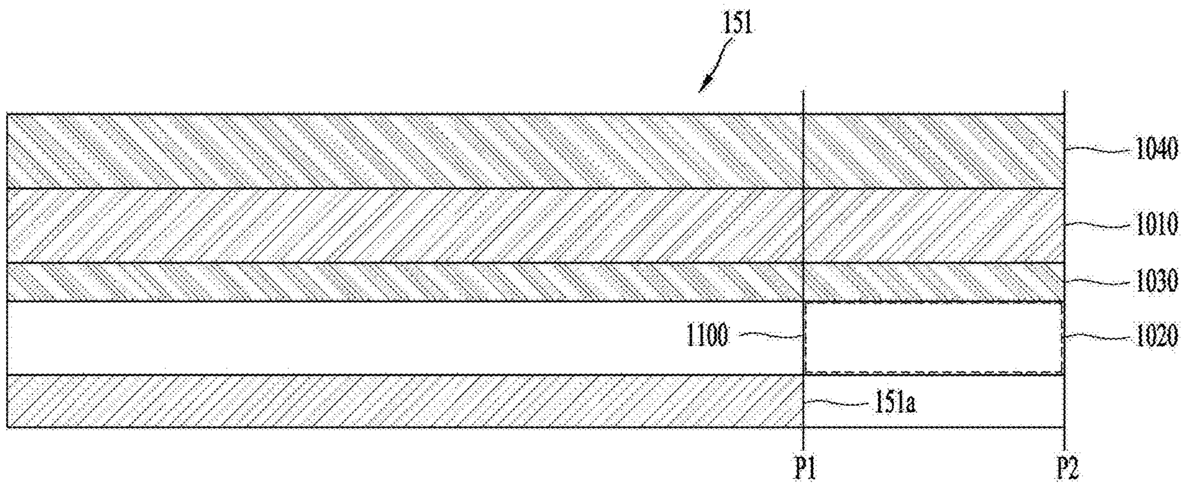
FIG. 21 illustrates a structure in which a dielectric substrate having a phased array antenna disposed thereon is coupled with a dielectric cover layer and a display.
Figure 21:
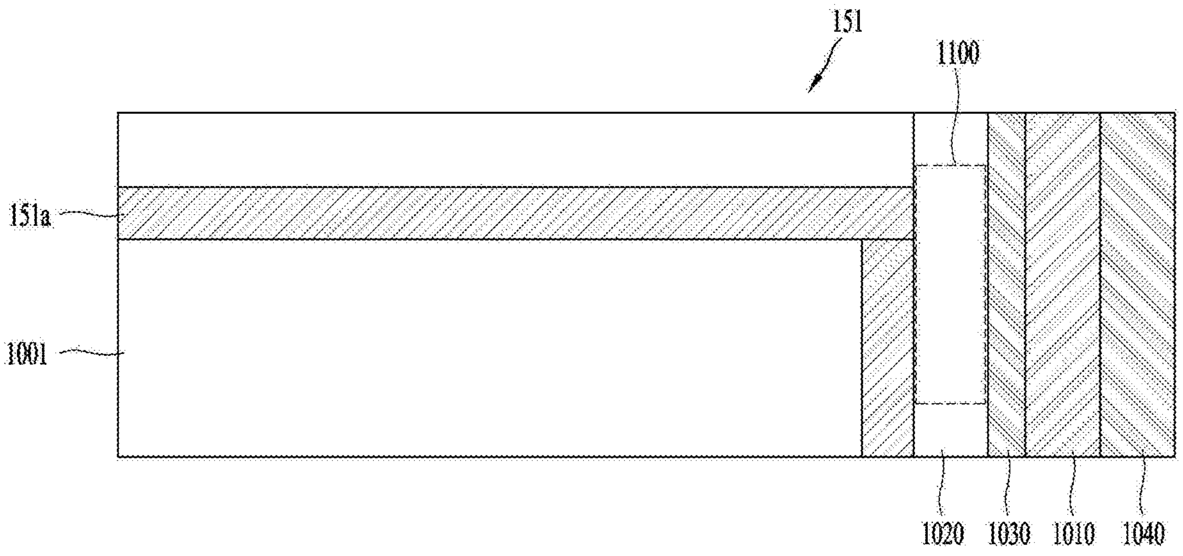

(a) of FIG. 21 is a view of a structure in which an antenna module 1100 formed as a phased array antenna is arranged on a front surface of an electronic device 1000. In some embodiments, a structure is illustrated in which the antenna module 1100 is arranged below the display 151, which is formed on a front side of the electronic device. Referring to (a) of FIG. 21, a pixel circuit 151*a* may be formed up to a first point R1. Accordingly, an area where information is displayed on the display 151 may be formed up to the first point R1, and a bezel area may be formed from the first point R1 to a second point R2. As another example, the pixel circuit 151*a* may be formed to an end of the electronic device 1000 to implement a full display. Accordingly, an area where information is displayed on the display 151 may be formed up to the second point R1, thereby implementing a bezel-less full display.

(b) of FIG. 21 is a view of a structure in which the antenna module 1100 formed as the phased array antenna is arranged on a side surface of the electronic device 1000. A dielectric cover layer 1010 may be formed on a dielectric substrate 1020, on which the antenna module 1100 is formed, so that the antenna module 1100 may be protected from an external environment. For example, a display cover 1040 may be formed on the dielectric cover layer 1010. Accordingly, the electronic device 1000 may have a full display formed on the front and side surfaces. For this purpose, the pixel circuit 151*a* may also be formed on the side surface. The antenna module 1100 may be arranged in a case 1001 of the electronic device or in a case separate from the case 1001.

Referring to FIGS. 7 to 21, the first patch element 1110*a* and the second patch element 1120*a* may be formed to be in direct contact with the surface of the dielectric cover layer 1010. In this regard, the stacked structure of FIG. 16 is illustrated based on the antenna structure of FIG. 7, but is not limited thereto. The stacked structure of FIG. 16 may also be applied to the antenna structure of FIG. 13. In some embodiments, the first parasitic patch element 1110*p* and the second patch element 1120*p* may be formed to be in direct contact with a surface of the dielectric cover layer 1010.

The antenna module may further include an adhesive layer 1030 by which the dielectric substrate 1020 is attached to the dielectric cover layer 1010. The first patch element 1110*a* and the second patch element 1120*a* may be formed to be in direct contact with the adhesive layer 1030. In this regard, the stacked structure of FIG. 16 is illustrated based on the antenna structure of FIG. 7, but is not limited thereto. The stacked structure of FIG. 16 may also be applied to the antenna structure of FIG. 13. In some embodiments, the first parasitic patch element 1110*p* and the second patch element 1120*p* may be formed to be in direct contact with the adhesive layer 1030.

The dielectric cover layer 1010 may be configured to have a first dielectric constant. For example, the dielectric cover layer 1010 may be configured to have a dielectric constant between 3.0 and 10.0. In some embodiments, the adhesive layer 1030 may be configured to have a second dielectric constant which is lower than the first dielectric constant. In this regard, antenna efficiency may be improved by lowering the dielectric constant of the adhesive layer 1030 which is in direct contact with the first patch element 1110*a* and the second patch element 1120*a*. In some embodiments, antenna directivity (gain) may be improved by increasing the dielectric constant of the dielectric cover layer 1010, which is spaced apart from the first patch element 1110*a* and the second patch element 1120*a* by at least certain distances.

The phased array antenna 1100 may be configured to radiate radio frequency signals at an operating frequency. Radio frequency signals of the operating frequency may be formed to exhibit an effective wavelength while propagating through the dielectric cover layer 1010. The dielectric cover layer 1010 may have a thickness which is 0.15 to 0.3 times the effective wavelength. The thickness of the dielectric cover layer 1010 may be set to a value in a certain range based on 0.25 times the effective wavelength, namely, ¼ wavelength of the effective wavelength. Accordingly, antenna directivity (gain) may be improved by increasing the dielectric constant of the dielectric cover layer 1010, which is spaced apart from the first patch element 1110*a* and the second patch element 1120*a* by at least certain distances.

The electronic device may further include a display 151 having a pixel circuit 151*a*. The display 151 may form a first surface, which is the front surface of the electronic device. The display 151 may include a first surface and a second surface. Accordingly, the display 151 may be formed on the front surface of the electronic device and, in some cases, may also be formed on the side surface of the electronic device. The display 151 may include a pixel circuit 151*a* which emits light through the display cover layer 1040 and the dielectric cover layer 1010. The display cover layer 1040 may form the first surface of the electronic device, and the dielectric cover layer 1010 may be formed adjacent to the display cover layer 1040.

Figure 22A:
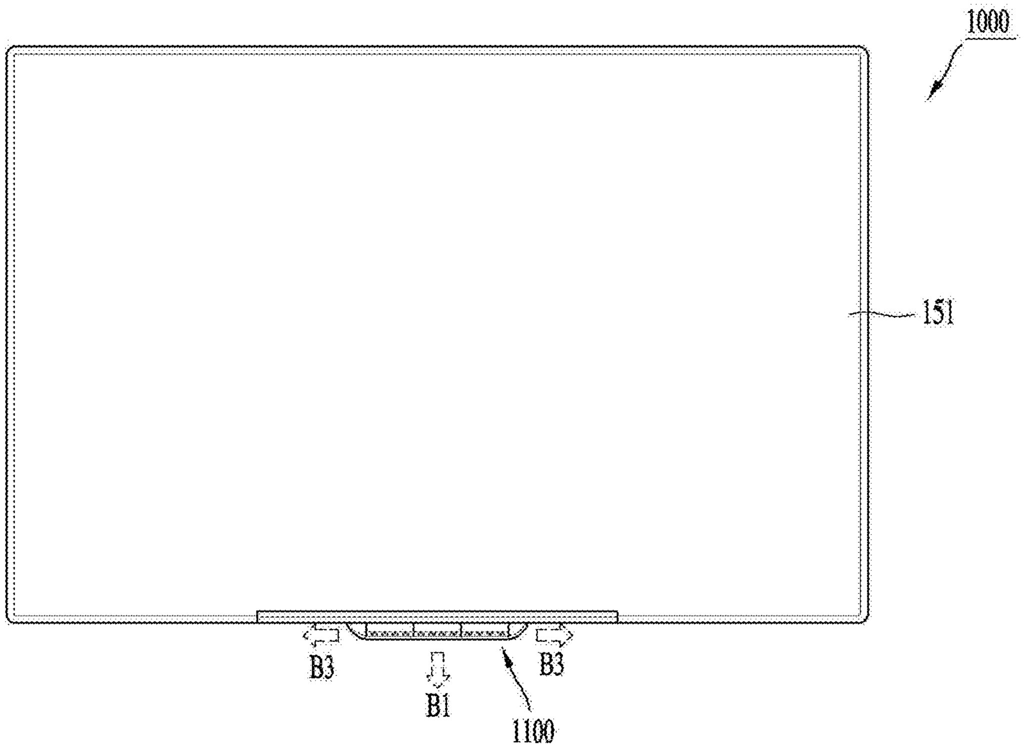
FIG. 22A illustrates a structure in which an antenna module having a first type antenna and a second type antenna as array antennas are is arranged on an electronic device.
Figure 22B:
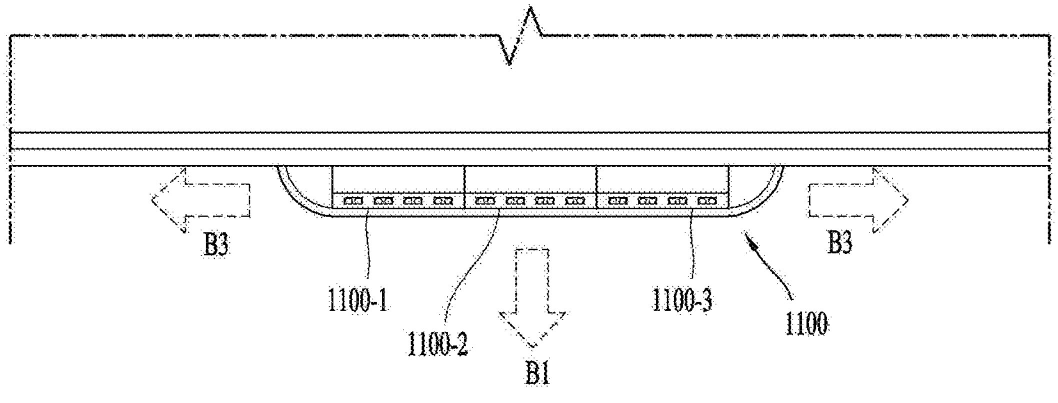
FIG. 22B is an enlarged view of a plurality of array antenna modules.

The antenna module disclosed herein may be configured as an array antenna. In this regard, FIG. 22A is a view of a structure in which the antenna module 1100 having a first type antenna and a second type antenna as array antennas is arranged on the electronic device 1000. FIG. 22B is an enlarged view of a plurality of array antenna modules. FIG. 22A and FIG. 22B are views of a structure in which the antenna module 1100 corresponding to the phased array antenna is formed on a side surface of a lower portion of the electronic device 1000. The antenna module 1100 of FIGS. 22A and 22B may have the structure, in which the antenna module 1100 is arranged on the side surface of the lower portion of the display 151 of (b) of FIG. 21.

Referring to FIGS. 1 to 22B, the array antenna may include a first array antenna module 1100-1, and a second array antenna module 1100-2 spaced apart from the first array antenna module 1100-1 by a certain gap in a first horizontal direction. In some embodiments, the number of array antennas is not limited to two, but may be at least three as illustrated in FIG. 22B. Therefore, the array antenna may include a first array antenna module 1100-1 to a third array antenna module 1100-3. As one example, at least one of the first array antenna module 1100-1, the second array antenna module 1100-2, or the third array antenna module 1100-3 may be arranged on a side surface of the antenna module 1100 and thus form a beam in a side direction.

As another example, at least one of the first array antenna module 1100-1, the second array antenna module 1100-2, or the third array antenna module 1100-3 may be disposed on a front surface of the antenna module 1100 and thus form a beam in a front direction. For example, the first array antenna module 1100-1 and the second array antenna module 1100-2 may form a first beam and a second beam in the front direction B1. The processor 1400 corresponding to the modem of FIG. 5C may control the first array antenna module 1100-1 and the second array antenna module 1100-2 to form the first beam and the second beam in a first direction and a second direction, respectively. For example, the processor 1400 may control the first array antenna module 1100-1 to form the first beam horizontally in the first direction. Also, the processor 1400 may control the second array antenna module 1100-2 to form the second beam horizontally in the second direction. In this regard, the processor 1400 may perform MIMO using the first beam of the first direction and the second beam of the second direction.

The processor 1400 corresponding to the modem of FIG. 5C may control the first array antenna module 1100-1 and the second array antenna module 1100-2 to form the first beam and the second beam in the first direction and the second direction, respectively. For example, the processor 1400 may control the first array antenna module 1100-1 to form the first beam horizontally in the first direction. Also, the processor 1400 may control the second array antenna module 1100-2 to form the second beam horizontally in the second direction. In this regard, the processor 1400 may perform MIMO using the first beam of the first direction and the second beam of the second direction.

The processor 1400 may form a third beam in a third direction using the first and second array antenna modules 1100-1 and 1100-2. In this regard, the processor 1400 may control the transceiver circuit 1250 to synthesize signals received through the first and second array antenna modules 1100-1 and 1100-2. Also, the processor 1400 may control the transceiver circuit 1250 to distribute signals transmitted to the first and second array antenna modules 1100-1 and 1100-2 into each antenna element. The processor 1400 may perform beamforming using the third beam which has a beam width narrower than those of the first beam and the second beam.

In some embodiments, the processor 1400 may perform MIMO using the first beam of the first direction and the second beam of the second direction, and perform beamforming using the third beam having the narrower beam width than those of the first beam and the second beam. In relation to this, when a first signal and a second signal received from other electronic devices in the vicinity of the electronic device have qualities lower than or equal to a threshold value, the processor 1400 may perform beamforming using the third beam.

The number of elements of the array antenna may be two, three, four, and the like as illustrated, but is not limited thereto. For example, the number of elements of the array antenna may be expanded to two, four, eight, sixteen, and the like. Therefore, the array antenna may be configured as 1×2, 1×3, 1×4, 1×5, . . . , 1×8 array antenna.

Figure 23:
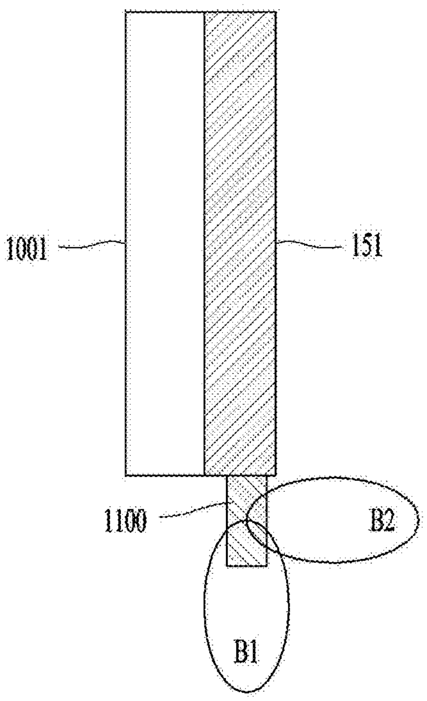
FIG. 23 illustrates antenna modules coupled in different coupling structures at specific position of an electronic device according to embodiments.
Figure 23:
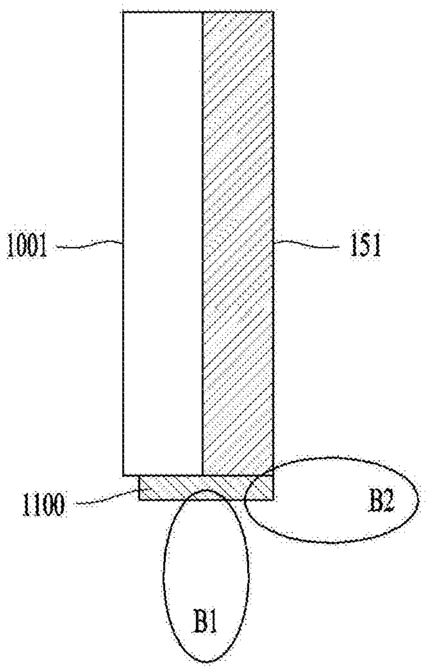
Figure 23:
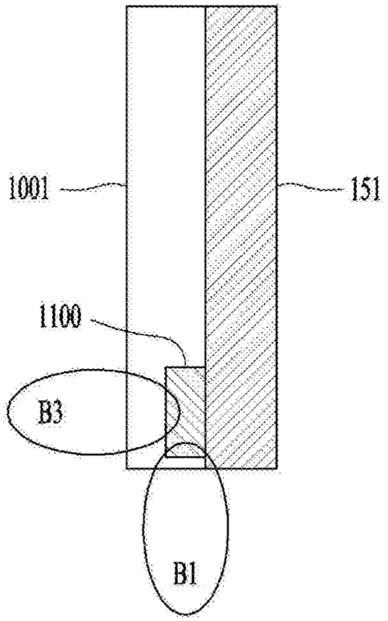

FIG. 23 is a view of an antenna module coupled in a different coupling structure at a specific position of an electronic device according to embodiments. Referring to (a) of FIG. 23, the antenna module 1100 may be arranged in a lower region of the display 151 to be substantially horizontal to the display 151. Accordingly, a beam B1 may be generated in a lower direction of the electronic device through the antenna module 1100. In some embodiments, another beam B2 may be generated in a front direction of the electronic device through a patch antenna. The antenna module 1100 of (a) of FIG. 23 may have the structure in which the antenna module 1100 is arranged on the lower portion of the front surface of the display 151 in (a) of FIG. 21.

Referring to (b) of FIG. 23, the antenna module 1100 may be arranged in the lower region of the display 151 to be substantially perpendicular to the display 151. Accordingly, a beam B2 may be generated in the front direction of the electronic device through the antenna module 1100. In some embodiments, another beam B1 may be generated in the lower direction of the electronic device through the patch antenna. The antenna module 1100 of (b) of FIG. 23 may have the structure in which the antenna module 1100 is arranged on the side surface of the lower portion of the display 151 in (a) of FIG. 21.

Referring to (c) of FIG. 21, the antenna module 1100 may be arranged, for example, inside a rear case 1001 corresponding to a mechanism structure. The antenna module 1100 may be arranged inside the rear case 1001 to be substantially parallel to the display 151. Accordingly, a beam B2 may be generated in the lower direction of the electronic device through a monopole radiator. In some embodiments, another beam B3 may be generated in a rear direction of the electronic device through a patch antenna.

So far, the broadband antenna module operating in the millimeter wave (mmWave) band and the electronic device having the same have been described. Hereinafter, technical effects of a broadband antenna module operating in a millimeter wave (mmWave) band and an electronic device having the same will be described.

According to an embodiment, antenna efficiency may be improved through a slot wall structure, which is formed between antenna elements in a broadband antenna module operating in a millimeter wave (mmWave) band.

According to an embodiment, a slot wall structure, which is formed between antenna elements in a broadband antenna module operating in an mmWave band, may be formed as a via structure on a multi-layered substrate, thereby improving antenna efficiency.

According to an embodiment, a slot wall structure may suppress side radiation components, thereby improving efficiency and directivity in a front direction of an antenna element operating in an mmWave band.

According to an embodiment, an antenna structure, which achieves high antenna efficiency while operating as a broadband antenna for providing a broadband service in an mmWave band, can be provided through a stacked antenna structure and a slot wall structure.

According to an embodiment, an antenna structure having improved antenna gain flatness over a whole frequency band with high antenna gain in a mmWave band may be provided through a structure of a slot wall and a dummy pattern inside the slot wall.

Further scope of applicability of the present disclosure will become apparent from the following detailed description. It should be understood, however, that the detailed description and specific examples, such as the preferred embodiment of the disclosure, are given by way of illustration only, further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art. In relation to the present disclosure described above, designing and driving of an antenna operating in a mmWave band and an electronic device controlling the antenna may be implemented as computer-readable codes on a medium having a program recorded thereon.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An antenna module comprising:

a dielectric cover layer; and a dielectric substrate having a surface mounted to face the dielectric cover layer, wherein the dielectric substrate comprises:

a first layer having a first conductive layer comprising a first opening and a second opening on a surface of the dielectric substrate, a first part of the first conductive layer being disposed between the first opening and the second opening, and a second part of the first conductive layer facing the first part of the first conductive layer in a vicinity of the first opening;

a second layer having a second conductive layer comprising a fourth opening and a fifth opening in the dielectric substrate, a first part of the second conductive layer being disposed between the fourth opening and the fifth opening, and a second part of the second conductive layer facing the first part of the second conductive layer in a vicinity of the fourth opening;

a third layer having a third conductive layer including a third opening in the dielectric substrate;

a fourth layer having a plurality of conductive traces;

a fifth layer having a fourth conductive layer configured to operate as ground; and a phased array antenna on the dielectric substrate, and wherein the phased array antenna comprises parasitic patch elements on the surface of the dielectric substrate, patch elements in the dielectric substrate, and transmission line paths coupled to positive antenna feed terminals on the patch elements in the dielectric substrate, respectively, the phased array antenna is configured to transmit radio-frequency signals at a frequency between 10 GHz and 300 GHz through the dielectric cover layer, the patch elements are placed in the second opening of the first conductive layer, the transmission line paths are arranged in the fifth opening of the second layer and the third opening of the third layer, the first part of the first conductive layer, the first part of the second conductive layer, and a first part of the third conductive layer are connected to each other by first conductive vias, the second part of the first conductive layer, the second part of the second conductive layer, and a second part of the third conductive layer are connected to each other by second conductive vias, a third part of the third conductive layer overlaps the first opening and the fourth opening, and the first conductive vias and the second conductive vias are electrically connected to the third part of the third conductive layer.

2. The antenna module of claim 1, wherein the second layer comprises a plurality of layers in the dielectric substrate, and a length of a long side of the second opening is equal to or greater than a length of a long side of the first opening.

3. The antenna module of claim 1, further comprising a plurality of dummy patterns arranged in the first opening on the dielectric substrate, wherein a length of a short side of the first opening is L1, and a length of a long side of the first opening is W1, wherein a first side value L2 of the plurality of dummy patterns is configured such that 0<L2<L1, and a second side value W2 of the plurality of dummy patterns is configured such that 0<W2<W1.

4. The antenna module of claim 1, further comprising a plurality of dummy patterns arranged in the third opening on the dielectric substrate, wherein a length of a short side of the first opening is L1, and a length of a long side of the first opening is W1, wherein a first side value L2 of the plurality of dummy patterns is configured such that 0<L2<L1, and a second side value W2 of the plurality of dummy patterns is configured such that 0<W2<W1.

5. The antenna module of claim 1, further comprising a plurality of first dummy patterns arranged in the first opening on the dielectric substrate; and a plurality of second dummy patterns arranged in the third opening on the dielectric substrate, wherein the plurality of first dummy patterns are electrically connected to the plurality of second dummy patterns through vertical conductive vias.

6. The antenna module of claim 1, wherein the first opening is arranged in an electric field direction of the phased array antenna.

7. The antenna module of claim 1, wherein the first layer having the first conductive layer further comprises a sixth opening in the surface of the dielectric substrate, a third part of the first conductive layer is disposed between the second opening and the sixth opening, a fourth part of the first conductive layer is disposed to face the third part of the first conductive layer, the second layer having the second conductive layer further comprises a seventh opening in the surface of the dielectric substrate, a third part of the second conductive layer is disposed between the fifth opening and the seventh opening, and the fourth part of the first conductive layer is disposed to face the third part of the second conductive layer in a vicinity of the seventh opening.

8. The antenna module of claim 7, wherein the third part of the first conductive layer, the third part of the second conductive layer, and a fifth part of the third conductive layer are connected to each other by third conductive vias, the fourth part of the first conductive layer, a fourth part of the second conductive layer, and a sixth part of the third conductive layer are connected to each other by fourth conductive vias, a fourth part of the third conductive layer overlaps the sixth opening and the seventh opening, and the third conductive vias and the fourth conductive vias are electrically connected to the fourth part of the third conductive layer.

* * * * *